United States Patent
Yasutomi

(10) Patent No.: US 9,323,490 B2
(45) Date of Patent: Apr. 26, 2016

(54) IMAGE PROCESSING APPARATUS AND IMAGE PROCESSING METHOD

(71) Applicant: Kei Yasutomi, Tokyo (JP)

(72) Inventor: Kei Yasutomi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/226,054

(22) Filed: Mar. 26, 2014

(65) Prior Publication Data

US 2014/0293341 A1   Oct. 2, 2014

(30) Foreign Application Priority Data

Mar. 29, 2013 (JP) ................................. 2013-071275

(51) Int. Cl.
*G06F 3/12* (2006.01)
*H04N 1/60* (2006.01)

(52) U.S. Cl.
CPC ............ *G06F 3/1256* (2013.01); *G06F 3/1208* (2013.01); *H04N 1/6011* (2013.01); *H04N 1/6086* (2013.01); *H04N 1/6097* (2013.01)

(58) Field of Classification Search
CPC .................................................. G06F 3/1256
See application file for complete search history.

(56) References Cited

U.S. PATENT DOCUMENTS

| 8,107,141 | B2 * | 1/2012 | Patrick ................. H04N 1/6011 345/419 |
| 2005/0219628 | A1 | 10/2005 | Yasutomi et al. |
| 2006/0066910 | A1 | 3/2006 | Yasutomi |
| 2006/0187505 | A1 * | 8/2006 | Ng ......................... G03G 15/01 358/518 |
| 2006/0279589 | A1 | 12/2006 | Yasutomi et al. |
| 2007/0070470 | A1 | 3/2007 | Takami et al. |
| 2007/0103730 | A1 | 5/2007 | Yasutomi |
| 2009/0154827 | A1 * | 6/2009 | Hanamoto .............. G06T 15/04 382/260 |
| 2011/0007333 | A1 | 1/2011 | Ishii et al. |
| 2011/0222125 | A1 | 9/2011 | Yasutomi et al. |

FOREIGN PATENT DOCUMENTS

| JP | 2007-110676 | 4/2007 |
| JP | 2009-130461 A | 6/2009 |
| JP | 2010-152533 | 7/2010 |
| JP | 2010-246049 | 10/2010 |
| JP | 2011-023834 | 2/2011 |
| JP | 2012-044421 | 3/2012 |
| JP | 2013-014299 A | 1/2013 |

OTHER PUBLICATIONS

Extended European Search Report dated Jul. 8, 2014 issued in corresponding European Application No. 14161536.9.

(Continued)

*Primary Examiner* — Mohammad Ghayour
*Assistant Examiner* — Lennin Rodriguezgonzalez
(74) *Attorney, Agent, or Firm* — Harness, Dickey & Pierce, P.L.C.

(57) ABSTRACT

An image processing device that displays a printed material, includes a first calculator configured to calculate display data based on: original data of an image printed on a sheet of paper; first data indicating diffuse reflection of the sheet; second data used for giving regular reflection texture of the sheet to a display image for displaying texture of the printed material; and third data used for giving regular reflection texture of the image to the display image for displaying the texture of the printed material.

14 Claims, 16 Drawing Sheets

(56) References Cited

OTHER PUBLICATIONS

Darling, Benjamin A. and James A. Ferwerda. "Tangible display systems: direct interfaces for computer-based studies of surface appearance." *Proceedings of SPIE*, vol. 7527 (2010): 75270Q-1-12.

Patil, Rohit A. et al. "3D Simulation of Prints for Improved Soft Proofing." *Proceedings of the Color Imaging Conference: Color Science and Engineering Systems, Technologies, Applications* (2004): 193-199.

* cited by examiner

PAPER-PORTION
REGULAR REFLECTION
APPLICABLE AREA DATA
FOR CAST-COATED
PAPER

PAPER-PORTION
REGULAR REFLECTION
APPLICABLE AREA DATA
FOR GLOSS-COATED
PAPER

PAPER-PORTION
REGULAR REFLECTION
APPLICABLE AREA DATA
FOR MAT-COATED
PAPER

REFERENCE:
ORIGINAL DATA

PAPER-PORTION
REGULAR REFLECTION
APPLICATION RATIO
DATA FOR CAST-
COATED PAPER

PAPER-PORTION
REGULAR REFLECTION
APPLICATION RATIO
DATA FOR GLOSS-
COATED PAPER

PAPER-PORTION
REGULAR REFLECTION
APPLICATION RATIO
DATA FOR MAT-
COATED PAPER

DATA HAVING
ONLY LOCAL
MAXIMUM VALUE
WRITTEN
THEREIN

IMAGE-PORTION
REGULAR REFLECTION
APPLICABLE AREA DATA
FOR CAST-COATED
PAPER

IMAGE-PORTION
REGULAR REFLECTION
APPLICABLE AREA DATA
FOR GLOSS-COATED
PAPER

IMAGE-PORTION
REGULAR REFLECTION
APPLICABLE AREA DATA
FOR MAT-COATED
PAPER

REFERENCE:
ORIGINAL DATA

IMAGE-PORTION REGULAR
REFLECTION APPLICATION
RATIO DATA FOR CAST-
COATED PAPER

IMAGE-PORTION REGULAR
REFLECTION APPLICATION
RATIO DATA FOR GLOSS-
COATED PAPER

IMAGE-PORTION REGULAR
REFLECTION APPLICATION
RATIO DATA FOR MAT-
COATED PAPER

REFERENCE: ORIGINAL DATA

CONVERSION CHARACTERISTIC DATA FOR CAST-COATED PAPER

CONVERSION CHARACTERISTIC DATA FOR GLOSS-COATED PAPER

CONVERSION CHARACTERISTIC DATA FOR MAT-COATED PAPER

REFERENCE:
ORIGINAL DATA

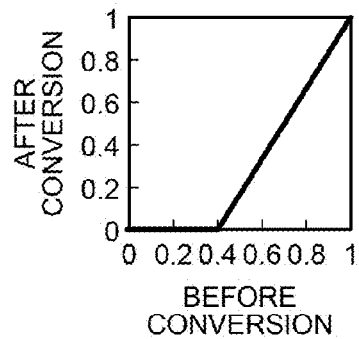
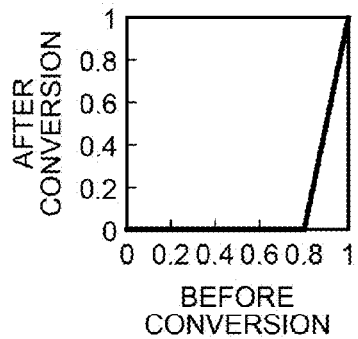
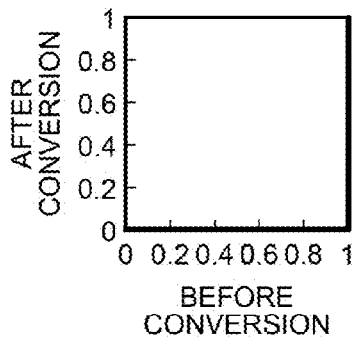
FIG.16A — CONVERSION CHARACTERISTIC DATA FOR CAST-COATED PAPER
FIG.16B — CONVERSION CHARACTERISTIC DATA FOR GLOSS-COATED PAPER
FIG.16C — CONVERSION CHARACTERISTIC DATA FOR MAT-COATED PAPER
FIG.17
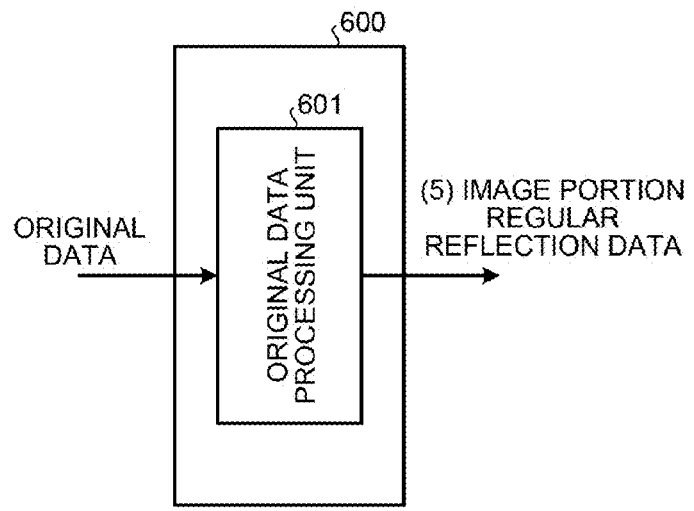

| TYPE OF PAPER | ATTENUATION PARAMETER VALUE a | b | c |
|---|---|---|---|
| CAST-COATED PAPER | 1.04 | 0.009 | -0.04 |
| GLOSS-COATED PAPER | 1.04 | 0.033 | -0.04 |
| MAT-COATED PAPER | 1.04 | 0.066 | -0.04 |

FIG.22

| TYPE OF PAPER | IMAGE PORTION REGULAR REFLECTION DATA GENERATION PARAMETER: rr |
|---|---|
| CAST-COATED PAPER | 0.55 |
| GLOSS-COATED PAPER | 0.45 |
| MAT-COATED PAPER | 0.40 |

FIG.23

| TYPE OF PAPER | ATTENUATION PARAMETER VALUE a | b | c |
|---|---|---|---|
| CAST-COATED PAPER | 1.04 | 0.036 | -0.04 |
| GLOSS-COATED PAPER | 1.04 | 0.047 | -0.04 |
| MAT-COATED PAPER | 1.04 | 0.066 | -0.04 |

FIG.24

| | ATTENUATION CHARACTERISTIC | |
|---|---|---|
| FIRST EMBODIMENT | $PR(x, y) = \dfrac{a}{1 + \left(\dfrac{r}{b}\right)^2} + c$ | $a = 1.04$<br>$b = 0.033$<br>$c = -0.04$ |
| FIRST COMPARISON EXAMPLE | $PR(x, y) = \dfrac{a}{1 + \left(\dfrac{r}{b}\right)^2} + c$ | $a = 1.2$<br>$b = 0.033$<br>$c = -0.2$ |
| SECOND COMPARISON EXAMPLE | $PR(x, y) = \dfrac{a}{1 + \left(\dfrac{r}{b}\right)^3} + c$ | $a = 1.01$<br>$b = 0.033$<br>$c = -0.01$ |
| THIRD COMPARISON EXAMPLE | $PR(x, y) = A \exp\left(-\left(\dfrac{r}{\sigma}\right)^2\right) + B$ | $A = 1.01$<br>$\sigma = 0.05$<br>$B = -0.01$ |

FIG.25

| | VISUAL EVALUATION RESULT | RANKING |
|---|---|---|
| FIRST EMBODIMENT | ○<br>ATTENUATION CHARACTERISTIC FROM REGULAR REFLECTION TO DIFFUSE REFLECTION IS APPROPRIATE<br>(VISIBLE AS REAL LIGHTING REFLECTION) | 1 |
| FIRST COMPARISON EXAMPLE | △<br>ATTENUATION CHARACTERISTIC OF TRANSITION FROM REGULAR REFLECTION TO DIFFUSE REFLECTION IS TOO MODERATE | 2 |
| SECOND COMPARISON EXAMPLE | △<br>ATTENUATION CHARACTERISTIC OF TRANSITION FROM REGULAR REFLECTION TO DIFFUSE REFLECTION IS TOO STEEP | 3 |
| THIRD COMPARISON EXAMPLE | ×<br>ATTENUATION OF ATTENUATION CHARACTERISTIC OF TRANSITION FROM REGULAR REFLECTION TO DIFFUSE REFLECTION IS TOO STEEP | 4 |

IMAGE PROCESSING APPARATUS AND IMAGE PROCESSING METHOD

CROSS-REFERENCE TO RELATED APPLICATIONS

The present application claims priority to and incorporates by reference the entire contents of Japanese Patent Application No. 2013-071275 filed in Japan on Mar. 29, 2013.

BACKGROUND OF THE INVENTION

1. Field of the Invention

The present invention relates to an image processing apparatus capable of performing a 3D display of a printed material, as well as relates to an image processing method.

2. Description of the Related Art

Various image processing apparatuses have been proposed that have the function of displaying the finished state of a printed material on a display device, such as a display, so as to allow previewing the finished state of printed material. Herein, the finished state of the printed material may be previewed with the aim of confirming the colors of the printed material, or confirming additional information of an output device (a printer), or confirming what is called the texture of the printing paper. Moreover, because of the function that allows previewing the finished state of a printed material, the actual state of the printed material can be presented to the user in an easy-to-understand manner. Hence, such a function helps in preventing a mismatch in the perception related to the finished state of the printed material or preventing printing errors, and thus offers an advantage of enabling achieving reduction in unnecessary tasks.

As a function that allows previewing a printed material; what is called a 3D (three-dimensional) display preview function has also been proposed that allows previewing the printed material by varying the position of lighting or the viewpoint position. Particularly, in the case of performing color reproduction by taking into account the effect of regular reflection light or the gloss of the printed material surface, or in the case of attempting to reproduce the gloss feel or the texture of the real printed material; it is effective to implement the 3D display preview function that enables varying the position of lighting or the viewpoint position.

For example, Japanese Laid-open Patent Publication No. 2012-44421 discloses a technology of simulating a 3D display preview (soft proof) by also taking into account the gloss component (i.e., the reflection of lighting). According to that technology, at the time of performing a 3D display preview, the lighting environment for viewing of the users is easily obtained and incorporated in the soft proof processing. As a result, an image of the printed material under the lighting environment for viewing is reproduced on a monitor with a high degree of accuracy.

Japanese Laid-open Patent Publication No. 2010-246049 discloses a technology in which, even in the case when a display device (display) not having a large dynamic range is used, in order to reproduce the gloss while maintaining the reproducibility of the colors of objects at the time of performing a 3D display preview; the specular colors are compressed so as to fit them within the dynamic range of the display device, the image synthesis ratio between the specular colors of objects and the diffuse reflection colors of objects is determined, and the reflected colors of objects are determined by synthesizing the specular colors of objects and the diffuse reflection colors of objects according to the image synthesis ratio that is determined.

Japanese Laid-open Patent Publication No. 2010-152533 discloses a technology in which, at the of performing a 3D display preview, in order to display on the display an image which has an identical texture to the texture of the printing surface of the printed material, a texture profile is provided that represents the correspondence relationship between a value of print data and a value of texture information data representing the texture of the printing surface.

In the technology disclosed in Japanese Laid-open Patent Publication No. 2012-44421, a single set of "lighting image data" is used at the time of performing a preview, and this single set of "lighting image data" is applied to a paper portion (a toner non-attachment portion) as well as to an image portion (a toner attachment portion). However, in such a configuration, the scope of lighting (the extent of blurring of lighting) that is reflected in a print image is same in the paper portion and the image portion. In contrast, in the actual printed material, generally, the gloss feel of the paper portion does not match with the gloss feel of the image portion. That is because the surface structure of the paper sheet is different than the surface structure of the portion of the paper sheet in which the toner is attached. Thus, in the technology disclosed in Japanese Laid-open Patent publication No. 2012-44421, with regard to a phenomenon that the scope of lighting reflected in the paper portion is different than the scope of lighting reflected in the image portion, it is not possible to express the texture (the gloss feel) of the printed material. That is, it is not possible to express the real feel of the printed material.

Moreover, from among various imaging methods, when particularly the electrophotographic image method is implemented to perform image processing and to form images, a typical phenomenon is observed in which the gloss in the medium concentration area decreases to a lower level than the paper portion and the image portion (the solid portion), and the reflection of lighting spreads widely. In such a state too, in the technology disclosed in Japanese Laid-open Patent Publication No. 2012-44421, it is not possible to reproduce colors because of the same reason as explained above.

Furthermore, in the technology disclosed in Japanese Laid-open Patent Publication No. 2012-44421, the configuration is such that a sample printed material is output and, for each of a plurality of colors, the gloss component as well as the diffuse component is obtained in advance. However, it means that an enormous number of man-hours are put into performing the measurement related to obtaining the gloss component and the diffuse component (as far as the unmeasured colors are concerned; even if derivation is done by means of interpolation, it is necessary to have a sufficient measurement result that enables estimation of all colors at a certain accuracy). Moreover, at the time of performing a preview, a look up table (LUT) is used to derive both components of the required colors. However, not only the LUT is configured to hold the characteristic values on a color-by-color basis, but also the colors have the three-dimensional degree of freedom. As a result, there is an enormous volume of data present in the LUT. Moreover, during the process of referring to the LUT and deriving both components of the required colors, an enormous calculation load is also involved. Thus, according to the method disclosed in Japanese Laid-open Patent Publication No. 2012-44421, in a condition in which it is necessary to perform real-time processing for the purpose of calculating the data value for a preview image (i.e., in a condition in which it is necessary to perform processing in a short period of time), the processing load is large.

During the calculation of specular colors in the technology disclosed in Japanese Laid-open Patent Publication No.

2010-246049, a normal vector (N) indicating the normal direction of the object surface, a light source vector (L) indicating the direction of the light source, an eye direction vector (E), and a parameter (n) indicating the degree of diffusion of the gloss are used; and the specular colors are determined according to a predetermined calculation formula. Moreover, from the (post-dynamic-range-compression) values of specular colors calculated in the abovementioned manner, a synthesis ratio ($\alpha$) of specular colors and a synthesis ratio ($\beta$) of diffuse reflection are calculated according to predetermined calculation formulae.

However, in the technology disclosed in Japanese Laid-open Patent Publication No. 2010-246049, the configuration is such that the parameter (n) indicating the degree of diffusion of the gloss is measured for each patch in an actually-output patch image and is stored in an LUT. Since the parameter (n) indicating the degree of diffusion of the gloss needs to be measured for each patch image, an enormous number of man-hours are taken to create the LUT. Moreover, also at the time of calculating the specular colors using the LUT created in the abovementioned manner, it becomes necessary to search for the concerned location from the enormous LUT, thereby resulting in an increase in the processing load.

Moreover, in the technology disclosed in Japanese Laid-open Patent Publication No. 2010-246049, during the process of calculating the specular colors, it is also necessary to calculate the angular difference between the light source vector (L) and the reflection vector (R) of the eye vector. Since such calculation of the angular difference needs to be performed at each position on the object, the calculation load goes no increasing. If the light source is a point light source or a line light source, then a small amount of calculation is required to calculate the angular differences. However, if a plurality of light sources is present and has a complex shape, many calculations are required to calculate the angular difference between the light source and the reflection vector at each position on the object. Hence, the angular differences cannot be calculated in a simple manner. Thus, it is not possible to deal with a case in which a plurality of light sources having complex shapes is present.

Furthermore, in the technology disclosed in Japanese Laid-open Patent Publication No. 2010-246049, trouble occurs at the location of calculating the synthesis ratio between the specular reflection and the diffuse reflection. In the technology disclosed in Japanese Laid-open Patent Publication No. 2010-246049, at the time of calculating the synthesis ratio, it is necessary to first calculate a maximum value Cs'(max) of the (post-compression) specular colors. At that time, it is a feature of the maximum value Cs'(max) of the (post-compression) specular colors that, only after a (post-compression) specular color Cs' is calculated for all points on the object, the maximum value Cs' becomes clear for the first time. Hence, in the technology disclosed in Japanese Laid-open Patent Publication No. 2010-246049, the (post-compression) specular color Cs' is calculated for all points on the object and then the maximum value Cs'(max) of the (post-compression) specular colors is determined. Subsequently, from the maximum value Cs'(max) of the (post-compression) specular colors and from the (post-compression) specular color Cs', the synthesis ratio between the specular reflection and the diffuse reflection is determined for all points on the object followed by the determination of the reflected color. That is, for all points on the object, the data access needs to be performed twice, which leads to an increase in the calculation load.

In the technology disclosed in Japanese Laid-open Patent Publication No. 2010-152533, texture information data can be obtained using a texture profile. Moreover, the texture information data is expressed using parameters of the bidirectional reflectance distribution function (BRDF); and is expressed as a coefficient (m) indicating the surface roughness of the object, an object surface reflectance ($\rho s$), a coefficient (ks) corresponding to the object surface reflectance ($\rho s$), an internal diffuse reflectance ($\rho d$) of the object, a coefficient (kd) corresponding to the internal diffuse reflectance ($\rho d$) of the object, and an index of refraction (n) of the object.

In the technology disclosed in Japanese Laid-open Patent Publication No. 2010-152533, in the case of performing a printed material preview, the value of data for preview display is calculated using the abovementioned parameters and implementing a calculation formula specified in Japanese Laid-open Patent Publication No. 2010-152533. However, such calculation needs to be performed at each position of the printed material to be previewed. As a result, the calculation load becomes extremely large.

Besides, regarding obtaining the parameters of the bidirectional reflectance distribution function (BRDF) too, the incident light and the reflected light need to be varied independent of each other. Hence, obtaining the parameters also requires a lot of time and effort. Moreover, every time a print image formed on a new paper sheet is to be reproduced using a preview device, it becomes necessary to obtain the BRDF parameters. Hence, in the technology disclosed in Japanese Laid-open Patent Publication No. 2010-152533, since the method of obtaining the parameters requires a lot of time and effort, reproducing a preview of a print image formed on a new paper sheet requires a lot of toil. Thus, it becomes difficult to deal with print images formed on various types of paper.

Therefore, there is a need for an image processing device and an image processing method that, in regard to a three-dimensional display preview function, enable achieving enhancement in the texture including the gloss feel of the printed material and enable displaying (reproducing) the texture.

SUMMARY OF THE INVENTION

According to an aspect of the present invention, there is provided an image processing device that displays a printed material, including a first calculator configured to calculate display data based on: original data of an image printed on a sheet of paper; first data indicating diffuse reflection of the sheet; second data used for giving regular reflection texture of the sheet to a display image for displaying texture of the printed material; and third data used for giving regular reflection texture of the image to the display image for displaying the texture of the printed material.

According to another aspect of the present invention, there is provided an image processing method for displaying a printed material, including calculating display data based on: original data of an image printed on a sheet of paper; first data indicating diffuse reflection of the sheet; second data used for giving regular reflection texture of the sheet to a display image for displaying texture of the printed material; and third data used for giving regular reflection texture of the image to the display image for displaying the texture of the printed material.

The above and other objects, features, advantages and technical and industrial significance of this invention will be better understood by reading the following detailed descrip-

BRIEF DESCRIPTION OF THE DRAWINGS

FIGS. 16A to 16C are diagrams illustrating conversion characteristics (conversion data) used during conversion of inverted data according to the third embodiment;

FIG. 17 is a diagram illustrating a configuration according to a fourth embodiment of the present invention;

FIG. 22 is a diagram illustrating a parameter rr of types of paper;

FIG. 23 is a diagram illustrating an attenuation parameter of the types of paper;

FIG. 24 is a diagram illustrating attenuation characteristics; and

FIG. 25 is a diagram illustrating a visual evaluation result.

DETAILED DESCRIPTION OF THE PREFERRED EMBODIMENTS

Exemplary embodiments of the present invention are described in detail below with reference to the accompanying drawings.

First Embodiment

Figure 2:
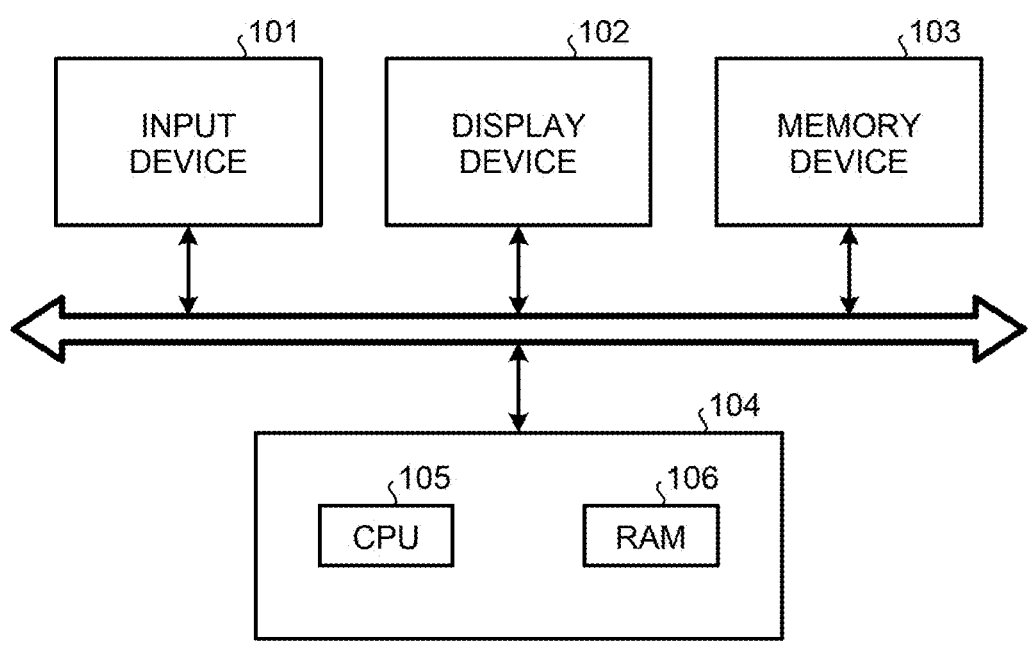
FIG. 2 is a diagram illustrating a configuration of an information processing device according to a first embodiment of the present invention.

In a first embodiment, the explanation is given for an information processing device that is capable of displaying a 3D (three-dimensional) display preview of a printed material or displaying the printed material on a display device such as a display. FIG. 2 is a diagram illustrating a configuration of the information processing device according to the first embodiment. A display device 102 is used to display print preview images, print images, and a user interface (UI). According to the first embodiment, the display device 102 is a liquid crystal display. However, that is not the only possible case. An input device 101 is used by a user to input instructions and necessary data values. Herein, the input device 101 according to the first embodiment includes a keyboard and a mouse. However, it is also possible to have other input devices connected as the input device 101. A processing device 104 is configured with a central processing unit (CPU) 105 and a random access memory (RAM) 106 that control the entire image processing device. A memory device 103 is used to store computer programs run by the CPU 105 and to store data used by the CPU 105.

In the first embodiment, depending on the contents of an instruction input by the user from the input device 101, the processing device 104 runs the computer programs stored in the memory device 103, processes the data stored in the memory device 103, and displays the processing result on the display device 102. As a result, the texture (the gloss feel) of the printed material is displayed (reproduced) on the display. That is, the printed material preview (or the printed material display) can be performed on a display by means of 3D display.

In the first embodiment, an instruction input by the user from the input device 101 has the following contents in concrete terms: 1. the original data of the target printed material for a printed material preview; and 2. the type of paper to be used in printing. Herein, although other types of instructions can also be taken into consideration, they are not the focus of the present invention. Hence, the following explanation is given by limiting the contents of an instruction input from the input device 101 to the contents mentioned above. Meanwhile, herein, the printed material is made of a paper sheet and the original data.

In the first embodiment, the original data is in the form of a data file having the BMP format. However, it is also possible to use any other file format. That is, instead of using raster images such as BMP images, it is also possible to use vector images such as PDF images. Moreover, in the first embodiment, the paper sheet is made selectable from three types of paper (namely, the cast-coated paper, the gloss-coated paper, or the mat-coated paper). These three types of paper are the representative types that characterize the textures of printing paper. If the textures of these three types of paper can be displayed (reproduced) in the 3D display preview of a printed material, then it is expected to be comparatively easier to reproduce the various other types of paper. In the first embodiment, although only three types of paper are made selectable, it is perfectly acceptable if other types of paper are also made selectable (i.e., more types of paper are also made selectable).

In the first embodiment, the configuration is such that data for previewing is calculated using the following types of data apart from using the original data: (1) paper portion diffuse reflection data; (2) paper portion regular reflection data; (3) paper-portion regular reflection applicable area data; (4) paper-portion regular reflection application ratio data; (5) image portion regular reflection data; (6) image-portion regular reflection applicable area data; and (7) image-portion regular reflection application ratio data.

Specifically, the original data indicates data of an image printed on a sheet of paper. The type of data (1) (first data in claims) indicates diffuse reflection of the sheet. The type of data (2) (fourth data in claims) indicates regular reflection of the sheet. The type of data (3) (fifth data in claims) is used for instructing segmentation of an area in which the fourth data is to be applied and an area in which the fourth data is not to be applied. The type of data (4) (sixth data in claims) indicates ratios at which the fourth data is applied. The type of data (5) (seventh data in claims) indicates regular reflection of the image. The type of data (6) (eighth data in claims) is used for instructing segmentation of an area in which the seventh data is to be applied and an area in which the seventh data is not to be applied. The type of data (7) (ninth data in claims) indicates ratios at which the seventh data is applied. Three types of data (2) to (4) (fourth data to sixth data in claims) may be collectively referred to as data (second data in claims) used for giving regular reflection texture of the sheet to a display image for displaying texture of the printed material. Three types of data (5) to (7) (seventh data to ninth data in claims) may be collectively referred to as data (third data in claims) used for giving regular reflection texture of the image to the display image for displaying the texture of the printed material.

In the first embodiment, the data of the types (1) to (7) are created in advance and stored in the memory device 103. Moreover, in the drawings, the data of the types (1) to (7) are illustrated as circled numbers.

The explanation given below is about (1) paper portion diffuse reflection data according to the first embodiment. In the first embodiment, the paper portion diffuse reflection data is created by taking images of real cast-coated paper (mirror coat platinum paper, Oji Paper Co., Ltd.) using a digital camera. While taking the images; the positioning of the paper sheets, the positioning of the lighting equipment, and the positioning of the image capturing device (the digital camera) was determined in such a way that images of diffuse reflection from the paper surface could be taken. More particularly, the images were taken by setting the angle of incident light from the lighting equipment to the paper sheets to 45° and by setting the position of the image capturing device to 0°.

Moreover, the image capturing conditions were adjusted to have a resolution of 400 dpi with respect to the size of the actual paper sheets. Furthermore, the brightness of the captured images was adjusted to have the average value of 235 (8 bits) (where "0" represents black and "255" represents white). Moreover, since the captured images were smaller in size as compared to the size of the printed material to be previewed (i.e., as compared to the size of the original data), the images were concatenated and expanded to the same size as the size of the printed material. In the first embodiment, the image data generated in this way is used as (1) paper portion diffuse reflection data.

In the first embodiment, a diffuse reflection image of a real paper sheet is captured using a digital camera. Hence, regarding the diffuse reflection on the paper surface, the characteristic that the diffuse reflection changes minutely at each position of the paper surface (i.e., the textures sensed in the diffuse reflection on the paper surface) can be incorporated in paper portion diffuse reflection data. That is, regarding the paper portion diffuse reflection data generated as described above, there is a change in the data value at each position (each pixel). Such changes in the data values reflect the characteristic in which the diffuse reflection on the paper surface changes minutely.

The explanation given below is about (2) paper portion regular reflection data according to the first embodiment. In the first embodiment, the paper portion regular reflection data is created by capturing images of real cast-coated paper (mirror coat platinum paper, Oji Paper Co., Ltd.) using a digital camera. While capturing the images; the positioning of the paper sheets, the positioning of the lighting equipment, and the positioning of the image capturing device (the digital camera) was determined in such a way that images of regular reflection from the paper surface could be taken. More particularly, the images were taken by setting the angle of incident light from the lighting equipment to the paper sheets to 20° and by setting the position of the image capturing device to 20°. While taking images using a digital camera, the image capturing conditions are adjusted to have a resolution of 400 dpi with respect to the size of the actual paper sheets. Furthermore, since the captured images were dark in nature, the brightness of the captured images was adjusted to have the average value of 253 (8 bits). Moreover, since the captured images are smaller in size as compared to the size of the printed material to be previewed (i.e., as compared to the size of the original data), the images are concatenated and expanded to the same size as the size of the printed material. Then, in the first embodiment, the image data generated in this way is used as (2) paper portion regular reflection data.

In the first embodiment, a regular reflection image of a real paper sheet is captured using a digital camera. Hence, regarding the regular reflection on the paper surface, the characteristic that the regular reflection changes minutely at each position of the paper surface (i.e., the textures sensed in the regular reflection on the paper surface) can be incorporated in paper portion regular reflection data. That is, regarding the paper portion regular reflection data generated as described above, there is a change in the data value at each position (each pixel). Such changes in the data values reflect the characteristics in which the regular reflection on the paper surface changes minutely.

In the first embodiment, in an identical manner to that with respect to the cast-coated paper, (1) paper portion diffuse reflection data and (2) paper portion regular reflection data is created also with respect to the gloss-coated paper and the mat-coated paper, and is stored in the memory device 103. Then, depending on the type of paper selected from the input device 101, (1) paper portion diffuse reflection data and (2) paper portion regular reflection data corresponding to the selected type of paper is read from the memory device 103.

The explanation given below is about (3) paper-portion regular reflection applicable area data. In the first embodiment, (3) paper-portion regular reflection applicable area data has the role of instructing, with respect to the original data, a segmentation in the form of an area in which the regular reflection of the paper portion is to be applied and an area in which the regular reflection of the paper portion is not to be applied. In the first embodiment, (3) paper-portion regular reflection applicable area data is in the form of a data file having the BMP format. Moreover, (3) paper-portion regular reflection applicable area data has the same size as the size of the original data. In the first embodiment, (3) paper-portion regular reflection applicable area data is also created corresponding to each of the abovementioned three types of paper and is stored in the memory device 103.

Figure 3A:
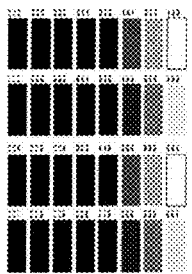
FIGS. 3A to 3C are diagrams illustrating paper-portion regular reflection applicable area data corresponding to original data illustrated in FIG. 3D according to the first embodiment.
Figure 3B:
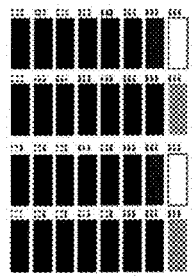
Figure 3C:
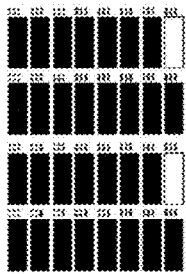
Figure 3D:
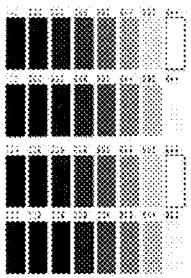

FIGS. 3A to 3C represent the outlines of sets of (3) paper-portion regular reflection applicable area data according to the first embodiment. Herein, FIGS. 3A to 3C represent the sets of (3) paper-portion regular reflection applicable area data corresponding to original data illustrated in FIG. 3D. Moreover, in FIGS. 3A to 3C, shades correspond to the data values of the application ratio of the paper portion regular reflection. The white portions correspond to image areas in which the regular reflection of the paper portion is applied (the paper portion regular reflection data has the application ratio of 1.0), while the black portions correspond to image areas in which the regular reflection of the paper portion is not applied (the paper portion regular reflection data has the application ratio of 0.0). Meanwhile, the original data of FIG. 3D is made of gray data (16 patch images in the upper half) and color data (16 patch images in the lower half).

According to the first embodiment, (3) paper-portion regular reflection applicable area data is created in such a way that each pixel corresponds to a value between 0.0 and 1.0. In the first embodiment, intermediate values between 0.0 and 1.0 are also used as the values of pixels. In the case of taking an intermediate value, the area is such that the application ratio is applied as the intermediate value to (2) paper portion regular reflection data (as described later in calculation formulae, the remaining application ratio at that time is compensated from (1) paper portion diffuse reflection data).

In the first embodiment, (3) paper-portion regular reflection applicable area data is created in the following manner. Prior to creating the data, a real print image is created by forming patch images on a real cast-coated paper sheet (mirror coat platinum paper, Oji Paper Co., Ltd.). Then, while visually confirming the print image, with respect to the area in which the gloss feel of the paper sheet is observed, value setting is done in such a way that the application ratio of the paper portion regular reflection data is 0.0. Moreover, intermediate values are set with respect to an area in which the gloss feel of the paper sheet is observed to be weak.

In the first embodiment, in an identical manner to that with respect to the cast-coated paper, (3) paper-portion regular reflection applicable area data is created also with respect to the gloss-coated paper and the mat-coated paper and is stored in the memory device 103. Then, depending on the type of paper selected from the input device 101, (3) paper-portion regular reflection applicable area data corresponding to the selected type of paper is read from the memory device 103.

The explanation given below is about (4) paper-portion regular reflection application ratio data. It is because of (4) paper-portion regular reflection application ratio data that the regular reflection part that is reflected on the surface of the paper portion of the printed material can be reproduced (i.e., the lighting is reflected and becomes visible).

In the first embodiment, (4) paper-portion regular reflection application ratio data is created in such a way that the ratio of applying the regular reflection texture of the paper portion differs according to the position. In the first embodiment, (4) paper-portion regular reflection application ratio data is in the form of a data file having the BMP format. In the first embodiment, (4) paper-portion regular reflection application ratio data is also created corresponding to each of the abovementioned three types of paper and is stored in the memory device 103.

Figure 4A:
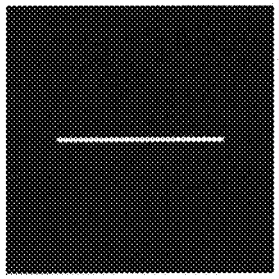
FIGS. 4A to 4C are diagrams illustrating paper-portion regular reflection application ratio data according to the first embodiment.
Figure 4B:
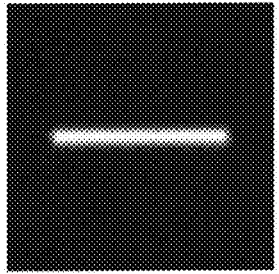
Figure 4C:
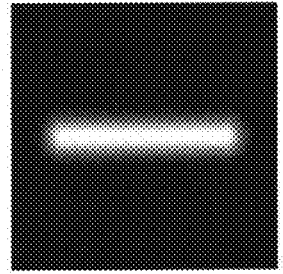

FIGS. 4A to 4C represent the outlines of sets of (4) paper-portion regular reflection application ratio data according to the first embodiment. In FIGS. 4A to 4C, shades correspond to the data values of (4) paper-portion regular reflection application ratio data. In the white portion, the value of (4) paper-portion regular reflection application ratio data corresponds to 1.0. In the black portion, the white portion, the value of (4) paper-portion regular reflection application ratio data corresponds to 0.0.

Figure 4D:
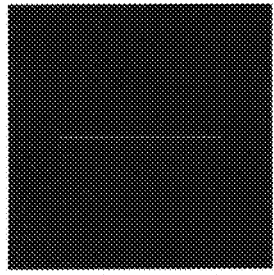
FIG. 4D is a diagram illustrating image data in which only a position of a local maximum value is written.

In the first embodiment, (4) paper-portion regular reflection application ratio data is created in the following manner. Firstly, image data in which only the position of the local maximum value is written is created at the same image size as the image size of application ratio data. FIG. 4D indicates the image data in which only the position of the local maximum value is written. A thin white portion in the center corresponds to a position ($x_0$, $y_0$) of the local maximum value. Subsequently, with respect to the image data in which only the local maximum value is written (i.e., with respect to FIG. 4D), a distance r from each pixel (each position) in the black portion to the closest local maximum value is calculated. Using the distances r, the value of (4) paper-portion regular reflection application ratio data of the pixel of interest is calculated using Equation (1) given below.

Depending on the size of a parameter b given in Equation (1); when the value of the parameter b is small, the drastically-attenuating characteristic of cast-coated paper usage (FIG. 4A) can be given to the application ratio data. On the other hand, when the value of the parameter b is large, the moderately-attenuating characteristic of cast-coated paper usage (FIG. 4C) can be given to the application ratio data.

$$PR(x, y) = \frac{a}{1 + \left(\frac{r}{b}\right)^2} + c \qquad (1)$$

Figures 20, 21:
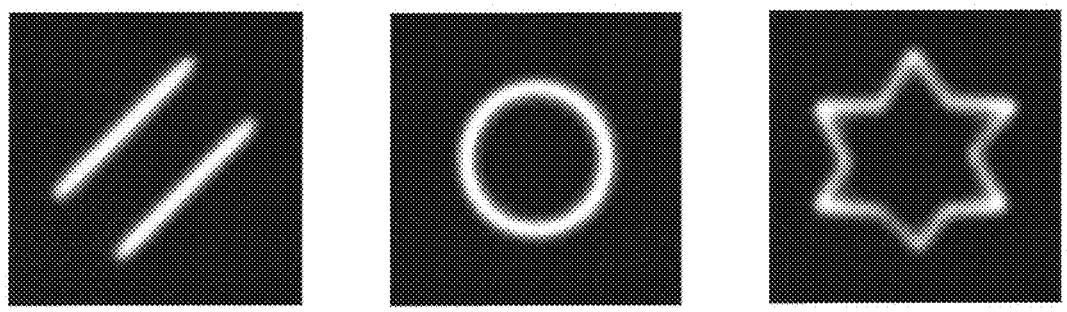
FIG. 20 is a diagram illustrating paper-portion regular reflection application ratio data and image-portion regular reflection application ratio data according to a tenth embodiment.
FIG. 21 is a diagram illustrating an attenuation parameter of the types of paper.

Herein, parameters a, b, and c are appropriately set parameters. In practice, the values of the parameters a, b, and c that are used in calculating the data illustrated in FIGS. 4A to 4C are illustrated in FIG. 21. The parameter b is dependent on the image size of (4) paper-portion regular reflection application ratio data. For that reason, in the case of creating (4) paper-portion regular reflection application ratio data having a different image size than the image size according to the first embodiment, it becomes necessary to adjust the value while maintaining the relative relationship. The value of the parameter b illustrated in FIG. 21 is the value in the case when 1.0 is set as the length of a side of the image size of (4) paper-portion regular reflection application ratio data.

The explanation given below is about (5) image portion regular reflection data according to the first embodiment. Herein, (5) image portion regular reflection data has the role of giving a gloss feel (a texture) to the image portion (the toner attachment portion). In the first embodiment, (5) image portion regular reflection data is generated by processing the original data. Equation (2) given below is a calculation formula for calculating (5) image portion regular reflection data according to the first embodiment.

$$Data' = Data*(1.0-rr)+255*rr \qquad (2)$$

Herein, "Data" corresponds to each component of RGB values in each pixel in the original data. In the first embodiment, "rr" changes the value for each type of paper. In the case of the cast-coated paper, rr=0.55 is used to calculate (5) image portion regular reflection data. Since the original data is assumed to be 8-bit RGB data, the value 255 corresponding to the white color is used in the second term in Equation (2). By adding this second term, the original data is converted to be brighter in nature. For that reason, it becomes possible to reproduce a condition in which the reflection of regular reflection is seen brighter in the image portion. Meanwhile, in the first embodiment, for other types of paper other than the cast-coated paper, the rr values used in Equation (2) are as specified in FIG. 22.

The explanation given below is about (6) image-portion regular reflection applicable area data according to the first embodiment. Herein, (6) image-portion regular reflection applicable area data is equivalent to the data when the image portion is the target for (3) paper-portion regular reflection applicable area data.

In the first embodiment, (6) image-portion regular reflection applicable area data has the role of instructing a segmentation about the area in which the regular reflection of the image portion is to be applied and the area in which the regular reflection of the image portion is not to be applied. In the first embodiment, (6) image-portion regular reflection applicable area data is in the form of a data file having the BMP format. Moreover, (6) image-portion regular reflection applicable area data has the same data size as the data size of the original data. In the first embodiment, three types of (6) image-portion regular reflection applicable area data corresponding to the abovementioned three types of paper are stored in the memory device 103.

Figure 5A:
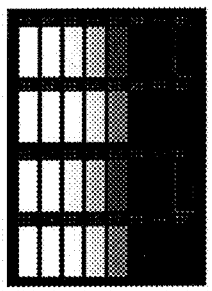
FIGS. 5A to 5C are diagrams illustrating image-portion regular reflection applicable area data corresponding to original data illustrated in FIG. 5D according to the first embodiment.
Figure 5B:
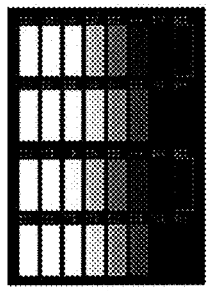
Figure 5C:
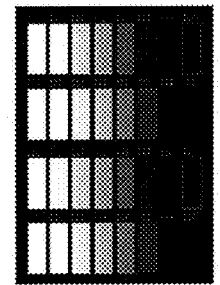
Figure 5D:
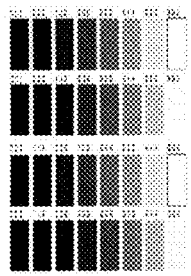

FIGS. 5A to 5C represent the outlines of sets of (6) image-portion regular reflection applicable area data according to the first embodiment. FIGS. 5A to 5C represent the sets of (6) image-portion regular reflection applicable area data corresponding to original data illustrated in FIG. 5D. In FIGS. 5A to 5C, shades correspond to the data values of the application ratio of the image portion regular reflection. The white portions correspond to image areas in which the regular reflection of the image portion is applied (the image portion regular reflection data has the application ratio of 1.0), while the black portions correspond to image areas in which the regular reflection of the image portion is not applied (the image portion regular reflection data has the application ratio of 0.0). In the first embodiment, (6) image-portion regular reflection applicable area data is created in such a way that each pixel corresponds to a value between 0.0 to 1.0. Herein, intermediate values between 0.0 and 1.0 are also used as the values of pixels. In the case of taking an intermediate value, the area is such that the application ratio is applied as the intermediate value to (6) image-portion regular reflection applicable area data (as described later in calculation formulae, the remaining application ratio at that time is compensated from (1) paper portion diffuse reflection data).

In the first embodiment, (6) image-portion regular reflection applicable area data is created in the following manner. Prior to creating the data, a real print image is created by forming patch images on a real cast-coated paper sheet (mirror coat platinum paper, Oji Paper Co., Ltd.). Then, while visually confirming the print image, with respect to the area in which the gloss feel peculiar to the image portion is observed, value setting is done in such a way that the application ratio of the image portion regular reflection data is 1.0. Moreover, with respect to the area in which a different gloss feel than the gloss feel of the images is observed, value setting is done in such a way that the application ratio of the image portion regular reflection data is 0.0.

In the first embodiment, in an identical manner to that with respect to the cast-coated paper, (6) image-portion regular reflection applicable area data is created also with respect to the gloss-coated paper and the mat-coated paper and is stored in the memory device 103. Then, depending on the type of paper selected from the input device 101, (6) image-portion regular reflection applicable area data corresponding to the selected type of paper is read from the memory device 103.

The explanation given below is about (7) image-portion regular reflection application ratio data according to the first embodiment. In the first embodiment, (7) image-portion regular reflection application ratio data is similar to (4) paper-portion regular reflection application ratio data explained above. Because of (7) image-portion regular reflection application ratio data, it becomes possible to reproduce the regular reflection part reflecting on the surface of the image portion of the printed material (i.e., the lighting is reflected and becomes visible).

In the first embodiment, (7) image-portion regular reflection application ratio data is created in such a way that the ratio of applying the regular reflection texture of the image portion is different according to the position. In the first embodiment, (7) image-portion regular reflection application ratio data is in the form of a data file having the BMP format. In the first embodiment, three types of (7) image-portion regular reflection application ratio data corresponding to the abovementioned three types of paper are stored in the memory device 103.

Figure 6A:
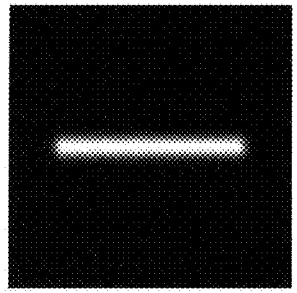
FIGS. 6A to 6C are diagrams illustrating image-portion regular reflection application ratio data according to the first embodiment.
Figure 6B:
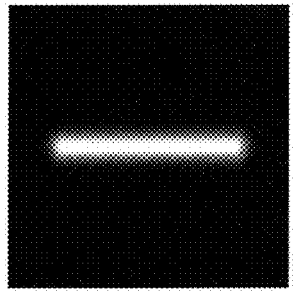
Figure 6C:
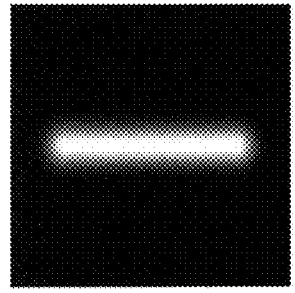

FIGS. 6A to 6C are represent the outlines of sets of (7) image-portion regular reflection application ratio data according to the first embodiment. In FIGS. 6A to 6C, shades correspond to the data values of (7) image-portion regular reflection application ratio data. The white portion corresponds to the ratio of 1.0 of the image regular reflection characteristic data, while the black portion corresponds to the ratio of 0.0 of the image-portion regular reflection application ratio data.

In the first embodiment, the method of creating (7) image-portion regular reflection application ratio data is identical to the method of creating (4) paper-portion regular reflection application ratio data. Hence, that explanation is not given again. In practice, the values of the parameters a, b, and c that are used in Equation (1) for calculating the data illustrated in FIGS. 6A to 6C are illustrated in FIG. 23.

Figure 1:
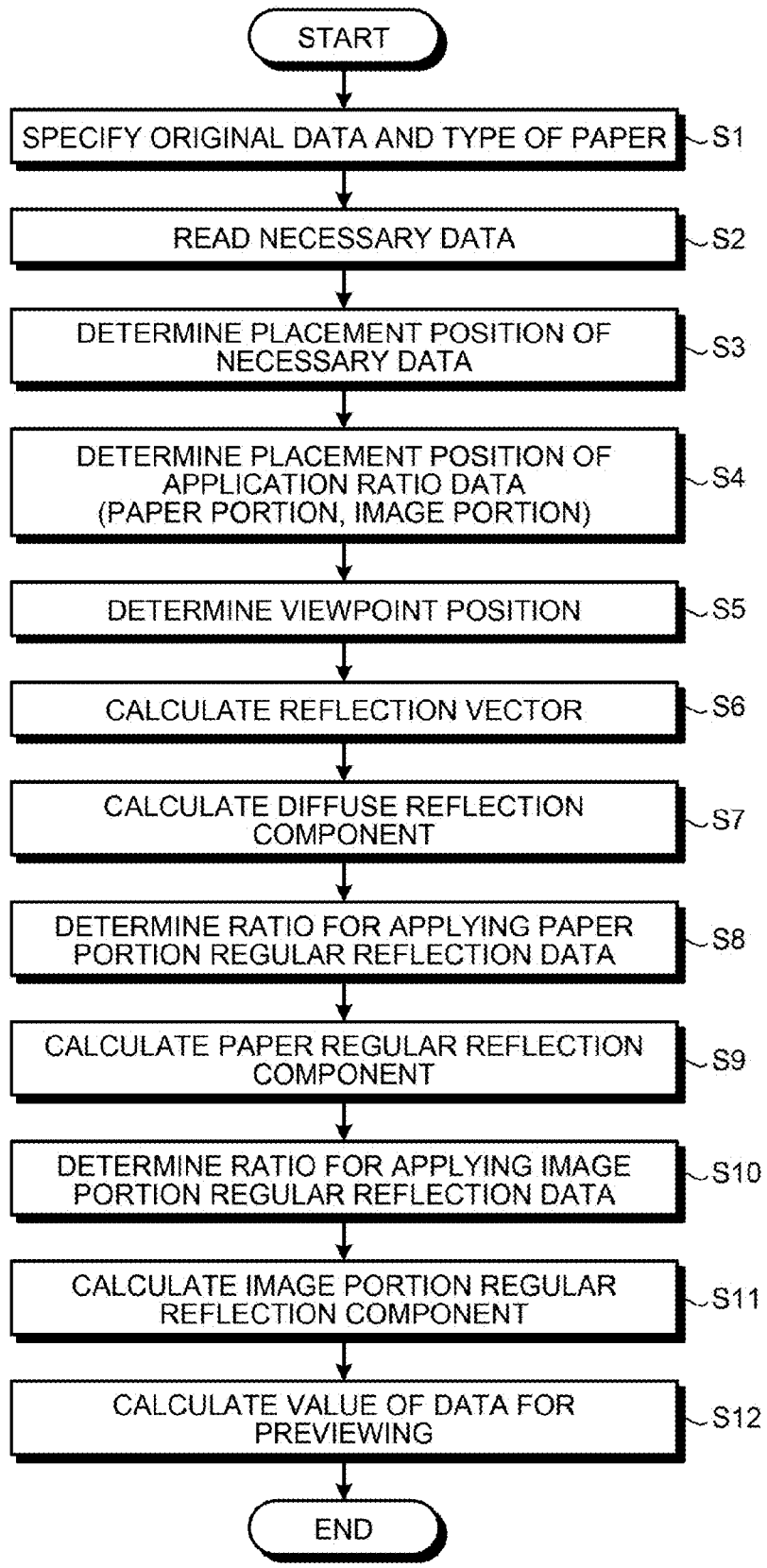
FIG. 1 is a process flowchart of an image processing method according to an embodiment of the present invention.

In the first embodiment, in the memory device 103 is stored a computer program in which the sequence of processing a variety of the abovementioned data is written. FIG. 1 is a process flowchart of an image processing method according to an embodiment of the present invention. Firstly, original data and the type of paper are specified from the input device 101 (Step S1).

Then, regarding each of seven types of data, namely, (1) paper portion diffuse reflection data, (2) paper portion regular reflection data, (3) paper-portion regular reflection applicable area data, (4) paper-portion regular reflection application ratio data, (5) image portion regular reflection data, (6) image-portion regular reflection applicable area data, and (7) image-portion regular reflection application ratio data stored in the memory device 103; the CPU 105 reads to the RAM 106 the data corresponding to the type of paper specified at Step S1 (Step S2).

Then, the following is determined in a sequential manner: a placement position S(x, y, z) of each coordinate position of original data; a placement position PD(x, y, z) of each coordinate position of (1) paper portion diffuse reflection data; a placement position PS(x, y, z) of each coordinate position of (2) paper portion regular reflection data; a placement position PAA(x, y, z) of each coordinate position of (3) paper-portion regular reflection applicable area data; a placement position IS(x, y, z) of each coordinate position of (5) image portion regular reflection data; and a placement position IAA(x, y, z) of each coordinate position of (6) image-portion regular reflection applicable area data (Step S3) (this operation corresponds to placing the original data and the data required for expressing the texture (the gloss feel) in a virtual three-dimensional space).

In the first embodiment, the placement is done in such a way that the center point of the original data matches with the origin of the virtual three-dimensional space. Moreover, except the data of the types (4) and (7) explained above; the data of the types (1) to (7) is placed at the same position of the original data. Furthermore, in the first embodiment, each coordinate position of the original data is placed in such a way that the original data forms a simple plane surface. Accordingly, the placement is done so as to ensure that each coordinate position of the data of the types (1) to (7) (except the data of the types (4) and (7)) is same as the original position. At that time, the placement is done in such a way that the plane surface on which the original data and the data of the types (1) to (7) (except the data of the types (4) and (7)) has the normal vector oriented in the Z-axis direction (in the first embodiment, the original data and the data of the types (1) to (7) (except the data of the types (4) and (7)) is placed in such a way that, at all coordinate positions, a normal vector n(x, y, z) becomes (0, 0, 1.0).

Then, a placement position PAR(x, y, z) of (4) paper-portion regular reflection application ratio data and a placement position IAR(x, y, z) of (7) image-portion regular reflection application ratio data are determined (Step S4) (this operation corresponds to determining the position of lighting in the virtual three-dimensional space).

In the first embodiment, the placement is such that the center of (4) paper-portion regular reflection application ratio data and the center of (7) image-portion regular reflection application ratio data match at a coordinate point (0, 0, 1.0) in the virtual three-dimensional space.

Figure 7:
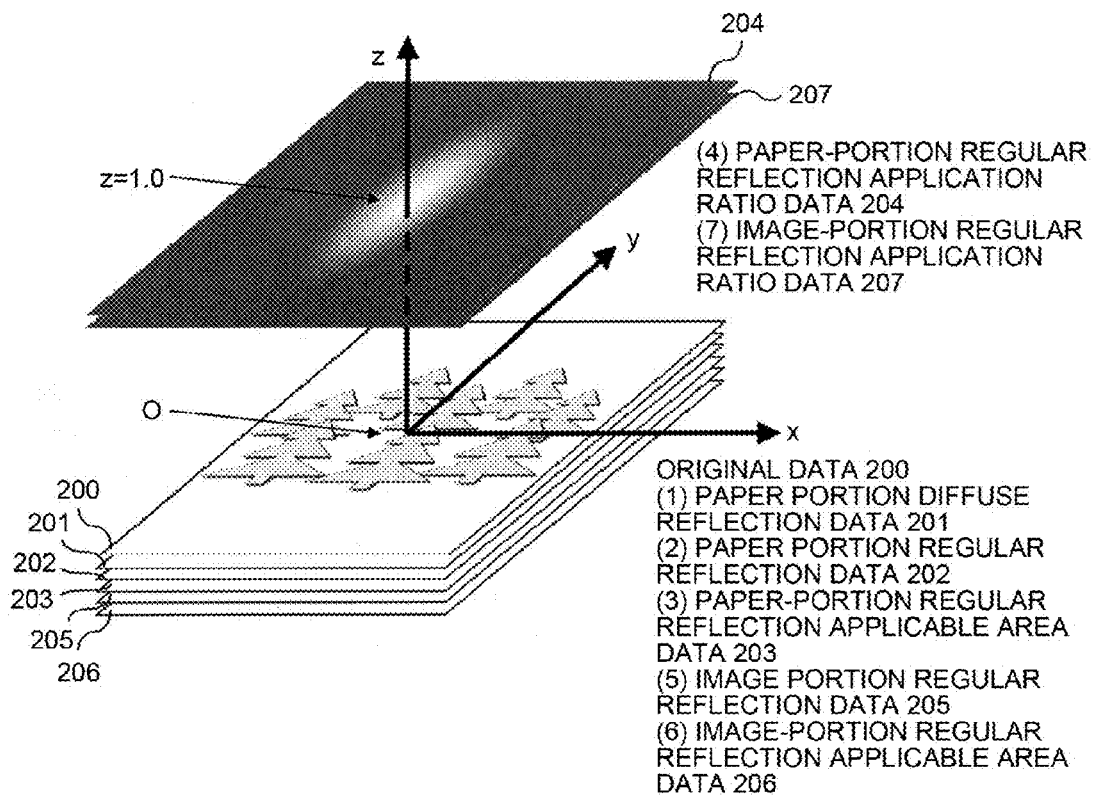
FIG. 7 is a diagram illustrating placement of original data and a variety of data in a virtual three-dimensional space.

FIG. 7 is a diagram illustrating a condition of placement of the original data and the data of (1) to (7), which is processed at Steps S3 and S4, in the virtual three-dimensional space. In FIG. 7, original data 200; (1) paper portion diffuse reflection data 201; (2) paper portion regular reflection data 202; (3) paper-portion regular reflection applicable area data 203; (5) image portion regular reflection data 205; and (6) image-portion regular reflection applicable area data 206 is placed in such a way that, at the same position, the center is at an origin O of the virtual three-dimensional space. Moreover, (4) paper-portion regular reflection application ratio data 204 and (7) image-portion regular reflection application ratio data 207 is placed at the same position of Z=1.0.

Figure 8:
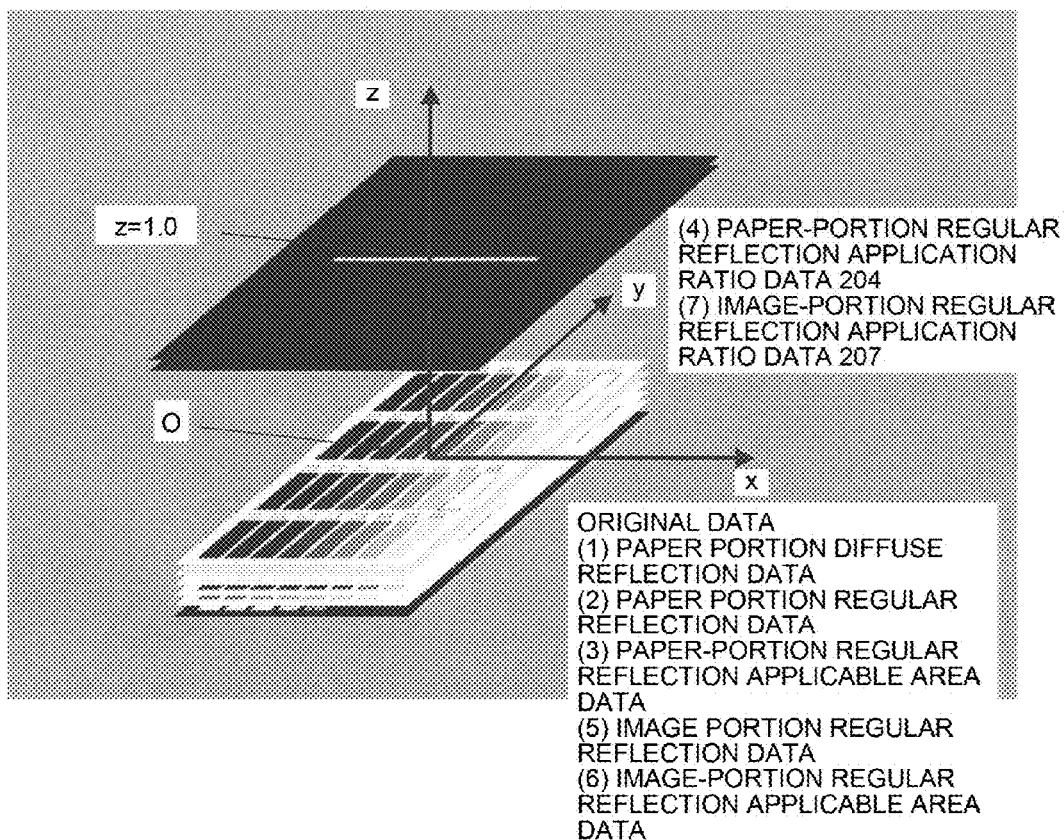
FIG. 8 is a diagram illustrating placement of actual original data and a variety of data in the virtual three-dimensional space.

Furthermore, the original data 200 and the data 201, 202, 203, 205, and 206 of (1) to (7) (except (4) and (7)) is placed parallel to the data 204 and 207 of (4) and (7). FIG. 8 is a diagram illustrating a condition of placement of the original data and the data of the types (1) to (7) in the virtual three-dimensional space in the case in which the actual original data is used as the original data illustrated in FIG. 7.

Then, a viewpoint position E(=(x, y, z)) is determined (Step S5) (this operation corresponds to determining a viewpoint position in the three-dimensional space). In the first embodiment, the coordinate point (0, 0, 1.0) is set to be the viewpoint position.

Subsequently, a reflection vector r(x, y, z) is calculated (Step S6). This reflection vector is calculated according to an equation illustrated in FIG. 9 using the viewpoint position E, the placement position S(x, y, z) of each coordinate position of the original data, and the normal vector n(x, y, z)=(0, 0, 1) at each coordinate position of the original data. Regarding each coordinate position of the original data, the reflection vector represents the direction of regular reflection on the face defined by the normal vector with respect to the vector directed from the viewpoint position toward the position of interest in the original data.

Figure 9:
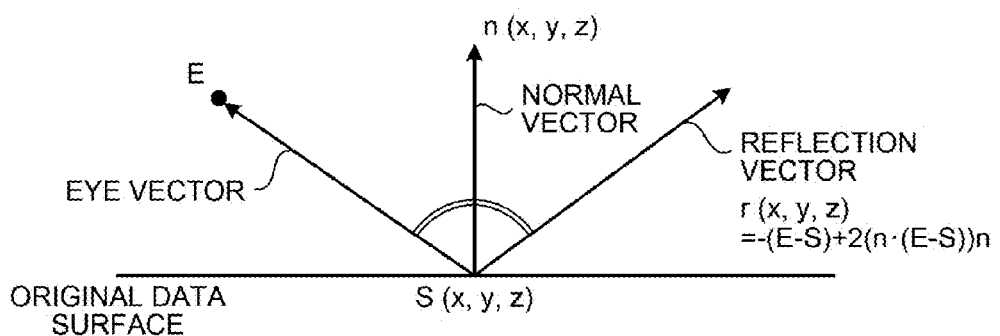
FIG. 9 is a diagram illustrating the relationship between a viewpoint position, an eye vector in the viewpoint direction, a placement position of each coordinate position of the original data, a normal vector, and a reflection vector.

In FIG. 9 is illustrated the relationship between the viewpoint position E, an eye vector in the viewpoint direction, the placement position S(x, y, z) of each coordinate position of the original data, the normal vector n(x, y, z), and the reflection vector r(x, y, z).

Then, using the original data and (1) paper portion diffuse reflection data, a diffuse reflection component of the data for previewing is calculated (Step S7). In the first embodiment, the diffuse reflection component is calculated by normalizing and multiplying the original data and (1) paper portion diffuse reflection data for each placement position (for each pixel) in the virtual three-dimensional space. That is, the value of a diffuse reflection component Cdiff is calculated as given below in Equation (3) from an original data value S and (1) paper portion diffuse reflection data value Pdiff at the same placement position in the three-dimensional space. In Equation (3), when each set of data is 8-bit data that is normalized and integrated, the value 255 is used to restore the original 8-bit data (if the data is not 8-bit data, the value 255 is changed in an appropriate manner).

$$Cdiff = S/255 \times Pdiff/255 \ast 255 \qquad (3)$$

Subsequently, using (3) paper-portion regular reflection applicable area data and (4) paper-portion regular reflection application ratio data, the ratio of applying (2) paper portion regular reflection data is determined (Step S8). This value of application ratio is the integrated value of (3) paper-portion regular reflection applicable area data at each coordinate position of the original data and (4) paper-portion regular reflection application ratio data in the direction indicated by the reflection vector r(x, y, z) that is calculated at each coordinate position of the original data.

Thus, as far as (3) paper-portion regular reflection applicable area data is concerned, the value of the position of interest in the original data is used. As far as (4) paper-portion regular reflection application ratio data is concerned, the value at such a position is used at which the direction indicated by the reflection vector at the position of interest in the original data intersects with (4) paper-portion regular reflection application ratio data placed in the virtual three-dimensional space. Then, the integrated value of both values serves as the value of the ratio for applying the paper portion regular reflection data at the position of interest in the original data.

Meanwhile, in the first embodiment, when the reflection vector does not intersect with (4) paper-portion regular reflection application ratio data, the value of (4) paper-portion regular reflection application ratio data is set to become equal to 0.0.

If Rpa represents the value of the ratio for applying the paper portion regular reflection data at the position of interest in the original data as calculated at Step S8, if Paa represents the value of (3) paper-portion regular reflection applicable area data at the position of interest in the original data, and if Par represents the value of (4) paper-portion regular reflection application ratio data at the position indicated by the reflection vector; then a calculation formula is as given in Equation (4).

$$Rpa = Paa \times Par \quad (4)$$

Subsequently, using the calculation result obtained at Step S8 and using (2) paper portion regular reflection data, a paper portion regular reflection component in the data for previewing is calculated (Step S9). In the first embodiment, the paper portion regular reflection component is calculated by integrating, for each position of interest (for each pixel) of the original data, the application ratio value calculated at Step S8 with the RGB values of (2) paper portion regular reflection data.

That is, the value of a paper regular reflection component CPspe is calculated using Equation (5) given below from the application ratio value Rpa (calculated at Step S8) corresponding to the position of interest in the original data placed in the virtual three-dimensional space and from a data value Pspec of (2) paper portion regular reflection data at the position of interest.

Figure 10:
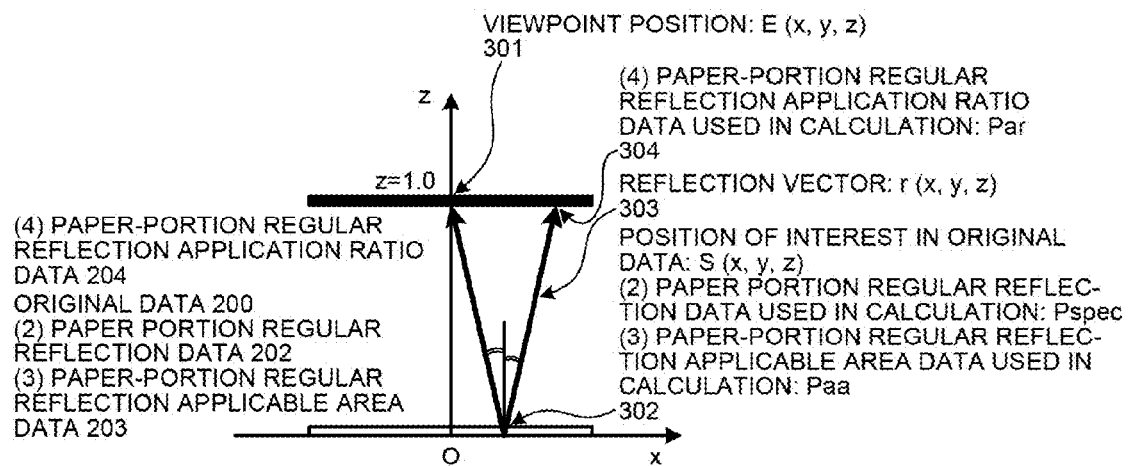
FIG. 10 is a diagram illustrating the positional relationship of a viewpoint position, a position of interest of the original data, the position of paper portion regular reflection data used in calculation, the position of paper-portion regular reflection applicable area data used in calculation, and the position of paper-portion regular reflection application ratio data used in calculation.

FIG. 10 is a diagram illustrating the positional relationship (the placement relationship) of a viewpoint position 301, a position of interest 302 of the original data, the position of (2) paper portion regular reflection data used in calculation, the position of (3) paper-portion regular reflection applicable area data used in calculation, and the position of (4) paper-portion regular reflection application ratio data 304 used in calculation.

$$CPspec = Rpa \times Pspec \quad (5)$$

Then, using (6) image-portion regular reflection applicable area data and (7) image-portion regular reflection application ratio data, the ratio for applying (5) image portion regular reflection data is determined (Step S10). This value of application ratio is an integrated value of (6) image-portion regular reflection applicable area data at each coordinate position of the original data and (7) image-portion regular reflection application ratio data at the position instructed by a reflection vector r(x, y, z) 303 that is calculated at each coordinate position of the original data.

Thus, as far as (6) image-portion regular reflection applicable area data is concerned, the value of the position of interest in the original data is used. As far as (7) image-portion regular reflection application ratio data is concerned, the value at such a position is used at which the direction indicated by the reflection vector at the position of interest in the original data intersects with (7) image-portion regular reflection application ratio data placed in the virtual three-dimensional space. Then, the integrated value of both values serves as the value of the ratio for applying the paper portion regular reflection data at the position of interest in the original data.

Meanwhile, in the first embodiment, when the reflection vector does not interest with (7) image-portion regular reflection application ratio data, the value of (7) image-portion regular reflection application ratio data is set to become equal to 0.0.

If Ria represents the value of the ratio for applying the image portion regular reflection data at the position of interest in the original data as calculated at Step S10, if Iaa represents the value of (6) image-portion regular reflection applicable area data at the position of interest in the original data, and if Iar represents the value of (7) image-portion regular reflection application ratio data at the position indicated by the reflection vector; then a calculation formula is as given in Equation (6).

$$Ria = Iaa \times Iar \quad (6)$$

Subsequently, using the calculation result obtained at Step S10 and using (5) image portion regular reflection data, an image portion regular reflection component in the data for previewing is calculated (Step S11). In the first embodiment, the image portion regular reflection component is calculated by integrating, for each position of interest (for each pixel) of the original data, the application ratio value calculated at Step S10 with the RGB values of (5) image portion regular reflection data.

That is, the value of an image regular reflection component CIspe is calculated using Equation (7) given below from Ria corresponding to the position of interest in the original data placed in the virtual three-dimensional space and from a data value Ispec of (5) image portion regular reflection data at the position of interest.

$$CIspec = Ria \times Ispec \quad (7)$$

Then, the value of the data for previewing at the position of interest in the original data is calculated from the diffuse reflection component Cdiff calculated at Step S7, the ratio Rpa for applying the paper portion regular reflection data as calculated at Step S8, the paper regular reflection component CPspe calculated at Step S9, the ratio Ria for applying the image portion regular reflection data as calculated at Step 10 S10, and the image regular reflection component CIspe calculated at Step S11.

More particularly, the value of the data for previewing is calculated using Equation (8) given below. As can be understood from Equation (8), in the data for previewing, as far as the diffuse reflection component Cdiff is concerned, normally the diffuse reflection component Cdiff is replaced with the paper regular reflection component CPspe or the image regular reflection component CIspe in a partial manner (in a portion in which the regular reflection component is to be reflected); the texture (the gloss feel) of the printed material is expressed.

$$P = Cdiff \times (1.0 - Rpa) \times (1.0 - Ria) + CPspe + CIspe \quad (8)$$

In the first embodiment, the value of the data for previewing as calculated by the operations from Steps S1 to S12 is subjected to rendering on a display that serves as the display device 102. As a result, the texture (the gloss feel) of the printed material can be reproduced and an "authentic" printed material texture can be reproduced on the display.

Thus, with the configuration according to the first embodiment, in the paper portion and the image portion (i.e., the portion in which ink or a toner is attached) of a printed material in particular, it becomes possible to reproduce even the difference in the textures (the gloss feels) such as the difference in the scopes of lighting that is reflected. Besides, in the first embodiment, as compared to the technique disclosed in Japanese Laid-open Patent Publication No. 2012-44421, an "authentic" printed material texture can be reproduced on the display with a smaller calculation load.

Till now, the explanation was given about the configuration according to the first embodiment. However, the present invention is not limited to the first embodiment. Alternatively, for example, the various parameters illustrated in FIGS. 21 to 23 can have values different than the values illustrated in FIGS. 21 to 23. Moreover, as far as the method of creating the data of the types (1) to (7) is concerned or as far as the method of pasting the data of the types (1) to (7) in the virtual three-dimensional space is concerned, it is possible to implement other methods than the methods described in the first embodiment.

Apart from that, while displaying a printed material in the preview mode, oftentimes it is ensured that the color temperature of the lighting is incorporated. The same functionality can be implemented in the first embodiment too. In that case, with respect to the necessary data such as the original data, (1) paper portion diffuse reflection data, (2) paper portion regular reflection data, and (5) image portion regular reflection data; an image is calculated in which color conversion is done in accordance with the light color temperature to be reflected, and the post-color-conversion data is used in calculating the data value for a preview image in an identical manner to the manner described above. With that, the printed material preview can be done in which the color temperature of the lighting is also incorporated.

Meanwhile, it goes without saying that the object of the present invention can be achieved when the method of calculating the data for previewing printed material is implemented in a computer program using a three-dimensional graphics application programming interface (API) such as OpenGL or DirectX.

COMPARISON EXAMPLES

In the first embodiment, (4) paper-portion regular reflection application ratio data incorporates the characteristics explained below (although the value of b differs for each type of paper, the relationship given below in Equation (9) is satisfied for each type of paper). That is, if ($x_0$, $y_0$) was set to represent the position indicating the local maximum value of (4) paper-portion regular reflection application ratio data, then (4) paper-portion regular reflection application ratio data PR (x, y) had become (4) paper-portion regular reflection application ratio data having the attenuation characteristic expressed in Equation (9).

$$PR(x, y) = \frac{a}{1 + \left(\frac{r}{b}\right)^2} + c \quad (9)$$

$$r = ((x - x_0)^2 - (y - y_0)^2)^{0.5}$$

Herein, the parameters a, b, and c are constant numbers set in an appropriate manner.

The inventor(s) of the present invention tested other attenuation characteristics too; and studied about the attenuation characteristics that, when a printed material previewing is performed, enable more authentic visual recognition as far as the shape of lighting reflected on the paper sheet is concerned. Given below is the explanation of the study results.

In this study, based on the configuration of the first embodiment, a printed material preview was performed by changing only (4) paper-portion regular reflection application ratio data. As far as the method of evaluation was concerned, a printed material preview image displayed on the display was evaluated by means of visual observation and the evaluation was performed from the perspective of whether or not it is seen to be a more authentic reflection of the shape of lighting.

The first embodiment is related to the attenuation characteristic given in Equation (9) (the details of the calculation formulae are given in FIG. 24). A first comparison example is related to an attenuation characteristic in which the multiplier of r in Equation (9) is changed from 2 to 1 (the details of the calculation formulae are given in FIG. 24). A second comparison is related to an attenuation characteristic in which the multiplier of r in Equation (9) is changed from 2 to 3 (the details of the calculation formulae are given in FIG. 24). A third comparison example is related to an attenuation characteristic of what is called Gaussian distribution (the details of the calculation formulae are given in FIG. 24).

The result of visual evaluation is illustrated in FIG. 25. As illustrated in FIG. 25, when the application ratio data was created using the attenuation characteristic according to the first embodiment, then the result indicated that the attenuation characteristic appears to be suitable and the reflection appears to be authentic. In contrast, in the first to third comparison examples, the visual observation result indicated that the attenuation is either too moderate or steep and the reflection appeared to be somewhat not real. Meanwhile, an item "ranking" in FIG. 25 indicates the result of ranking the attenuation characteristic from the perspective of whether the reflection appears to be authentic.

Regarding the result of the comparison experiments carried out by the inventor(s) of the present invention, while performing a 3D display preview of printed material, as far as the attenuation from the center of the lighting toward the surrounding of the lighting is concerned from the perspective of the reflection of lighting in the paper portion, the attenuation characteristic according to the first embodiment enables reproduction of an "authentic" texture of the paper sheet.

Meanwhile, regarding this comparison experiments, the explanation herein is given about the result of the comparison experiment performed with respect to (4) paper-portion regular reflection application ratio data. However, the inventor(s) of the present invention also performed an identical comparison experiment with respect to (7) image-portion regular reflection application ratio data; and obtained an identical result as was expected. That is, when (7) image-portion regular reflection application ratio data was created using the attenuation characteristic expressed by the function (IR(x, y)) given in Equation (9), then the result indicated that the attenuation characteristic appears to be suitable and the reflection in the paper portion appears to be authentic. In contrast, if any other attenuation characteristic is used, the visual observation result indicated that the attenuation is either too moderate or steep and the reflection appeared to be somewhat not real.

Further details of the comparison experiment with respect to (7) image-portion regular reflection application ratio data are identical to the comparison experiment with respect to (4) paper-portion regular reflection application ratio data. Hence, that explanation is not repeated. However, as far as the reflection of lighting in the image portion is concerned, the above-mentioned result of the comparison experiment is achieved. Thus, while performing a 3D display preview of printed material, as far as the attenuation from the center of the lighting toward the surrounding of the lighting is concerned from the perspective of the reflection of lighting in the image portion (the toner attachment portion); it becomes possible to reproduce an "authentic" texture of the image portion.

Second Embodiment

In a second embodiment, the explanation is given about generating image-portion regular reflection applicable area data from the original data. The configuration according to the second embodiment is identical for the most part to the configuration according to the first embodiment. However, as compared to the first embodiment, the second embodiment differs in the way that, instead of generating image-portion regular reflection applicable area data directly and manually while confirming an image in which (6) image-portion regular reflection applicable area data is actually printed as described in the first embodiment, an image-portion regular-reflection-applicable-area data generating unit is disposed that generates (6) image-portion regular reflection applicable area data from the original data.

Figure 11:
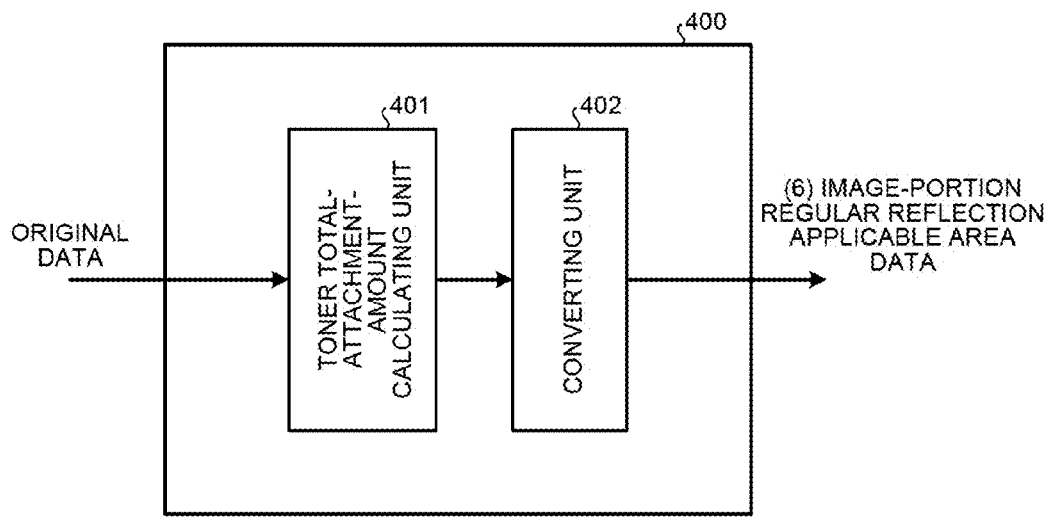
FIG. 11 is a diagram illustrating a configuration according to a second embodiment of the present invention.

The following explanation is given about the image-portion regular-reflection-applicable-area data generating unit according to the second embodiment. FIG. 11 is a diagram illustrating a configuration of the image-portion regular-reflection-applicable-area data generating unit according to the second embodiment. As illustrated in FIG. 11, an image-portion regular-reflection-applicable-area data generating unit 400 includes a toner total-attachment-amount calculating unit 401 and a converting unit 402 that converts the toner total-attachment-amount according to conversion data.

The toner total-attachment-amount calculating unit 401 receives the original data and calculates data values each of which corresponds to the toner total attachment amount for a pixel in the original data. In the second embodiment, the explanation is given for a case in which the original data is BMP data having 8-bit RGB colors per pixel. With respect to each pixel of the original data, the toner total-attachment-amount calculating unit 401 converts RGB values into CMYK data values. That is because, the characteristic of regular reflection of an image portion is highly correlated to the total attachment amount of the toner used in image formation. Hence, the RGB values are converted into CMYK data values that are compatible to the total attachment amount of the toner.

In the second embodiment, Ct, My, Yt, and Min_cmy are calculated from the RGB values. Min(Ct, Mt, Yt) represents the minimum value of the three values specified within the brackets.

$$Ct = 255 - R$$

$$Mt = 255 - G$$

$$Yt = 255 - B$$

$$\text{Min\_cmy} = \min(Ct, Mt, Yt) \quad (10)$$

Then, Ct2, Mt2, Yt2, and Kt2 are calculated. Herein, the calculation corresponds to ink generation (K component generation).

when Min_cmy > 127 (11)

$$Ct2 = Ct - (\text{Min\_cmy} - 127) \times \frac{152}{255}$$

$$Mt2 = Mt - (\text{Min\_cmy} - 127) \times \frac{152}{255}$$

$$Yt2 = Yt - (\text{Min\_cmy} - 127) \times \frac{152}{255}$$

$$Kt2 = (\text{Min\_cmy} - 127) \times 2$$

When Min_cmy ≤ 127 (12)
$Ct2 = Ct$
$Mt2 = Mt$
$Yt2 = Yt$
$Kt2 = 0$

Subsequently, Tot_cmyk is calculated using Equation (13) given below.

$$\text{Tot\_cmyk} = Ct2 + Mt2 + Yt2 + Kt2 \quad (13)$$

Then, with Max_cmyk=2.6×255, r is calculated according to Equation (14) given below. Using this value as Max_cmyk means that what is called total volume control performed below is set to 260%. In the second embodiment, although the total volume control is set to 260%, any other value can also be set.

$$r = \text{Max\_cmyk} - Kt2 / \text{Tot\_cmyk} - Kt2 \quad (14)$$

This r is used to calculate C, M, Y, and K.

$$C = Ct2 \ast r$$

$$M = Mt2 \ast r$$

$$Y = Yt2 \ast r$$

$$K = Kt2 \quad (15)$$

As a result of the calculation performed till now, CMYK values are calculated upon performing ink generation and total volume control.

Then, the data value of each of the CMYK colors is added and normalized with the total volume control value Max_cmyk so as to calculate T that is equivalent to the toner total amount (calculate the total amount against the total volume control value).

$$T = (C + M + Y + K) / \text{Max\_cmyk} \quad (16)$$

Figure 12A:
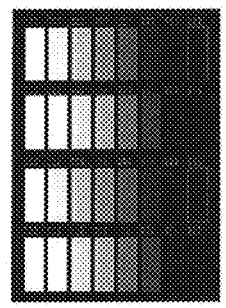
FIG. 12A is a diagram illustrating T that is equivalent to a toner total attachment amount calculated from original data illustrated in FIG. 12B.
Figure 12B:
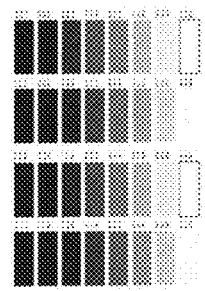

Explained above was the calculation process followed in the toner total-attachment-amount calculating unit 401. FIG. 12A is a diagram illustrating T that is equivalent to the toner total attachment amount calculated from the original data illustrated in FIG. 12B, by implementing the abovementioned method. In FIGS. 12A and 12B, the display is such that the white portion corresponds to T=1.0 and the black portion corresponds to T=0.0.

Figure 13A:
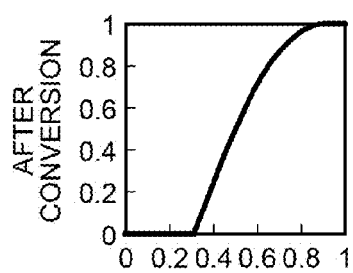
FIGS. 13A to 13C are diagrams illustrating conversion characteristics (conversion data) used during conversion of the toner total attachment amount T according to the second embodiment.
Figure 13B:
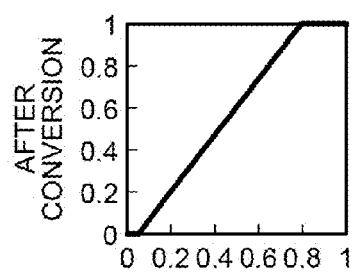
Figure 13C:
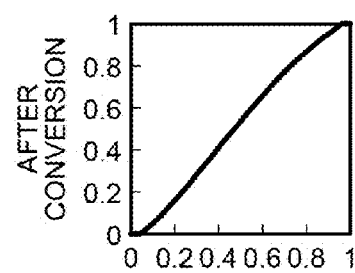

The converting unit 402 according to the second embodiment converts the value of T and generates (6) image-portion regular reflection applicable area data. FIGS. 13A to 13C are diagrams illustrating conversion characteristics (conversion data) used during conversion of the toner total attachment amount T according to the second embodiment. The conversion data is created in advance and stored so that it can be used by the image-portion regular-reflection-applicable-area data generating unit 400 according to the second embodiment. In the second embodiment, the conversion data is read and used by the converting unit 402 so as to convert the result calculated by the toner total-attachment-amount calculating unit 401 and to generate (6) image-portion regular reflection applicable area data. Meanwhile, regarding the conversion data, it is necessary to have three types corresponding to the three types of paper considered in the first embodiment. In FIGS. 13A to 13C is illustrated the conversion data corresponding to the three types of paper.

Given below is the explanation about the method of generating the conversion data according to the second embodiment. Firstly, a real print image is created by printing patch images on real cast-coated paper (mirror coat platinum paper, Oji Paper Co., Ltd.). Then, a preview is performed with the preview data having the toner total attachment amount T used without modification as (6) image-portion regular reflection applicable area data (i.e., the data illustrated in FIG. 12A is used without modification as (6) image-portion regular reflection applicable area data).

Then, while visually confirming the print image and the preview image, with respect to a toner attachment area in which the gloss feel peculiar to the image portion is conspicuously seen in the real image, a conversion characteristic that enables an increase in the value of T is written in the conversion data. On the other hand, with respect to a toner attachment area in which the gloss feel peculiar to the image portion is inconspicuously seen in the real image, a conversion characteristic that enables a decrease in the value of T is written in the conversion data.

In the second embodiment, the configuration is such that the conversion data is created for not only the cast-coated paper but also for the gloss-coated paper and the mat-coated paper in an identical manner, and the conversion data that corresponds to the paper selected in the preview is used.

In the second embodiment, using (6) image-portion regular reflection applicable area data created in the abovementioned manner, the data for previewing is calculated in an identical manner to the first embodiment. Herein, (6) image-portion regular reflection applicable area data is dependent on the original data. Hence, every time there is a change in the original data, (6) image-portion regular reflection applicable area data needs to be generated again. In contrast, the conversion data illustrated in FIGS. 13A to 13C represents the correspondence between the toner total attachment amount and a toner attachment amount range to which the texture of the image portion is applied. For that reason, the same conversion data can be used for different sets of original data.

Thus, once the conversion data is created, it can be applied without modification even if the original is changed to another original. As a result, in the configuration according to the second embodiment, there is an advantage that the user need not perform any new task in response to a change in the original data.

Third Embodiment

In a third embodiment, the explanation is given for a case in which paper-portion regular reflection applicable area data from the original data. The configuration according to the third embodiment is identical for the most part to the configuration according to the first embodiment. However, as compared to the first embodiment, the third embodiment differs in the way that, instead of generating paper-portion regular reflection applicable area data directly and manually while confirming an image in which (3) paper-portion regular reflection applicable area data is actually printed as described in the first embodiment, a paper-portion regular-reflection-applicable-area data generating unit is disposed that generates (3) paper-portion regular reflection applicable area data from the original data.

Figure 14:
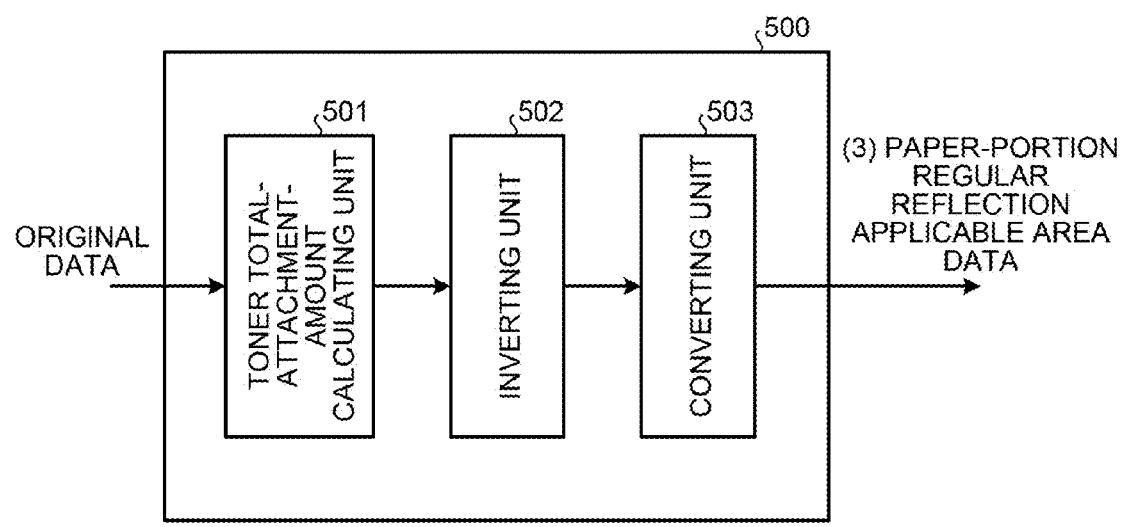
FIG. 14 is a diagram illustrating a configuration according to a third embodiment of the present invention.

The following explanation is given about the paper-portion regular-reflection-applicable-area data generating unit according to the third embodiment. FIG. 14 is a diagram illustrating a configuration of the paper-portion regular-reflection-applicable-area data generating unit according to the third embodiment. As illustrated in FIG. 14, a paper-portion regular-reflection-applicable-area data generating unit 500 includes a toner total-attachment-amount calculating unit 501, an attachment-amount-data inverting unit 502, and a converting unit 503. The toner total-attachment-amount calculating unit 501 according to the third embodiment has identical functionality to the functionality of the toner total-attachment-amount calculating unit 401 according to the second embodiment. That is, the toner total-attachment-amount calculating unit 501 receives the original data, calculates the toner total amount T, and sends the toner total amount T to the attachment-amount-data inverting unit 502.

The attachment-amount-data inverting unit 502 creates data T' in which the attachment amount is inverted using the following equation.

$$T'=1.0-T \quad (17)$$

As is clear from the calculation formula given in Equation (17), the attachment amount data T takes values from 0.0 to 1.0. For that reason, the inverted data T' calculated using Equation (17) represents the data in which the magnitude relationship of the toner total attachment amount is inverted. The attachment-amount-data inverting unit 502 sends the inverted data T' to the converting unit 503.

Figure 15A:
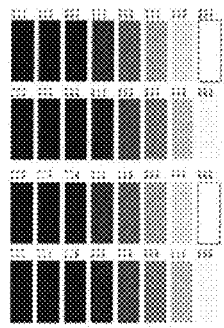
FIG. 15A is a diagram illustrating a result of inverting the toner total attachment amount T, which is calculated from original data illustrated in FIG. 15B.
Figure 15B:
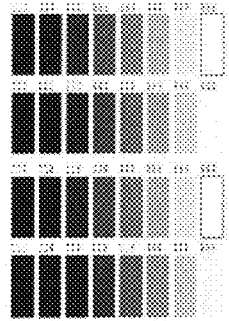

FIG. 15A is a diagram illustrating T' that is the inverted data of the toner total attachment amount and that is calculated from the original data illustrated in FIG. 15B, by implementing the method described above. In FIGS. 15A and 15B, the display is such that the white portion corresponds to T'=1.0, and the black portion corresponds to T'=0.0.

The converting unit 503 according to the third embodiment has similar functionality to the converting unit 402 according to the second embodiment. The converting unit 503 according to the third embodiment converts the value of the inverted data T' and generates (3) paper-portion regular reflection applicable area data.

FIGS. 16A to 16C are diagrams illustrating conversion data in which conversion characteristics are written that are used during conversion of the inverted data T' according to the third embodiment. The conversion data is created in advance and stored so that it can be used by the paper-portion regular-reflection-applicable-area data generating unit. In the third embodiment, the conversion data is read and used by the converting unit so as to convert the result calculated by the attachment-amount-data inverting unit 502 and to generate (3) paper-portion regular reflection applicable area data. Meanwhile, regarding the conversion data, it is necessary to have three types corresponding to the three types of paper considered in the first embodiment. In FIGS. 16A to 16C is illustrated the conversion data corresponding to the three types of paper.

Regarding the method of generating the conversion data according to the third embodiment, firstly, a real print image is created by printing patch images on real cast-coated paper (mirror coat platinum paper, Oji Paper Co., Ltd.). Then, a preview is performed with the preview data having the inverted data T' (FIG. 15A) used without modification as (3) paper-portion regular reflection applicable area data. Then, while visually confirming the print image and the preview image, with respect to a toner attachment area in which the gloss feel peculiar to the paper portion is conspicuously seen in the real image, a conversion characteristic that enables an increase in the value of T' is written in the conversion data. On the other hand, with respect to a toner attachment area in which the gloss feel peculiar to the paper portion is inconspicuously seen in the real image, a conversion characteristic that enables a decrease in the value of T' is written in the conversion data. In this way, the conversion data is created.

In the third embodiment, the configuration is such that the conversion data is created for not only the cast-coated paper but also for the gloss-coated paper and the mat-coated paper in an identical manner, and the conversion data that corresponds to the paper selected in the preview is used.

In the third embodiment, using (3) paper-portion regular reflection applicable area data created in the abovementioned manner, the data for previewing is calculated in an identical manner to the first embodiment. Herein, (3) paper-portion regular reflection applicable area data is dependent on the original data. Hence, every time there is a change in the original data, (3) paper-portion regular reflection applicable area data needs to be generated again. In contrast, the abovementioned conversion data represents the correspondence between the toner total attachment amount and a toner attachment amount range to which the texture of the image portion is applied. For that reason, the same conversion data can be used for different sets of original data. Thus, once the conversion data is created, it can be applied without modification even if the original is changed to another original. As a result, in the configuration according to the third embodiment, there is an advantage that the user need not perform any new task in response to a change in the original data.

Fourth Embodiment

In a fourth embodiment, the explanation is given for a case in which image portion regular reflection data is generated from original data. The configuration according to the fourth embodiment is identical for the most part to the configuration according to the first embodiment. However, as compared to the first embodiment, the fourth embodiment differs in the way that an image-portion regular reflection data generating unit is disposed that automatically generates (5) image portion regular reflection data.

Given below is the explanation about the image-portion regular reflection data generating unit according to the fourth embodiment. FIG. 17 is a diagram illustrating a configuration of the image-portion regular reflection data generating unit according to the fourth embodiment. As illustrated in FIG. 17, an image-portion regular reflection data generating unit 600 according to the fourth embodiment includes an original data processing unit 601 that generates data by processing the original data by implementing the calculation method same as Equation (2) according to the first embodiment. Then, the image-portion regular reflection data generating unit 600 according to the fourth embodiment considers the processed data to be (5) image portion regular reflection data and uses it in calculating the data for previewing.

As illustrated in FIG. 23, the image-portion regular reflection data generating unit 600 generates (5) image portion regular reflection data by applying different parameters to each type of paper. Moreover, the image-portion regular reflection data generating unit 600 converts data into brighter data. For that reason, the regular reflection occurs in the image portion, thereby making it possible to reproduce a condition for bright viewing.

Fifth Embodiment

In a fifth embodiment, the explanation is given about a case in which the normal vector changes according to the position of the printed material. The configuration according to the fifth embodiment is identical for the most part to the configuration according to the first embodiment. However, as compared to the first embodiment, the fifth embodiment differs in the way that, during the operation of determining the placement position of the original data and the other data (i.e., at Step S3 according to the first embodiment), instead of arranging the original data so as to have a constant normal vector as described in the first embodiment, the original data is placed in such a way that the normal vector of the original data differs at each position of the original data.

In the first embodiment, at Step S3, the setting is done to ensure that the normal vector has a constant value at each position of the original data.

$$n(x,y,z)=(0,0,1) \quad (18)$$

In contrast, in the fifth embodiment, the setting is done in such a way that the normal vector at each position of the original data has the value calculated in the following equation.

$$n(x, y, z) = \left(-\frac{e^{ax} - e^{-ax}}{2}, 0, 1\right) \Big/ \left(\left(-\frac{e^{ax} - e^{-ax}}{2}\right)^2 + 1\right)^{0.5} \quad (19)$$

Herein, x represents the coordinate in the virtual three-dimensional space indicating the placement position of the original data. A parameter a is dependent on the value taken by the coordinate x. In the fifth embodiment, the coordinate x is set in such a way that the original data is placed exactly at $-1.0 < x < 1.0$. Hence, in the fifth embodiment, the parameter a is set to be equal to 0.1.

The normal vector that is set according to the fifth embodiment is the normal vector of the original surface in the case when the placement position S(x, y, z) of the original data is placed according to the following equation.

$$S(x, y, z) = z - \left(\left(\frac{e^{ax} - e^{-ax}}{2a}\right) - \frac{1}{a}\right) = 0 \quad (20)$$

When the original data is placed at the placement position defined in Equation (20), the original surface is placed in a convexly-deformed manner in the downward direction with respect to the z-direction (at that time, the z-coordinate value changes only in the x-direction but not in the y-direction).

In the fifth embodiment, using the normal vector determined at each position of the original data, the subsequent operations are performed. Thus, except for the point that the placement position and the normal vector are different at each position of the original data, the operations performed in the fifth embodiment are identical to the operations performed in the first embodiment.

In the fifth embodiment, in an identical manner to the first embodiment, the value of the data for previewing is calculated and is subjected to rendering on a display that serves as a display device. As a result, in an identical manner to the first embodiment; the texture (the gloss feel) of the paper portion and the image portion of the printed material can be reproduced, and an "authentic" printed material texture can be reproduced on the display.

In addition to that, in the fifth embodiment, the setting is such that the normal vector at each position of the original data changes according to that position of the original data. Hence, on the surface of the printed material in the 3D display preview, the regular reflection part of the paper portion and the image portion is displayed to have a complex shape (if the normal vector is same at each position of the original data, then the regular reflection part of the paper portion and the image portion becomes monotonous in shape or changes in a monotonous manner).

In this way, in the fifth embodiment, during a 3D display preview, from the perspective of the complexity in the shape of lighting reflected on the surface of the printed material, it becomes possible to reproduce an "authentic" texture (gloss feel).

Sixth Embodiment

Figure 18:
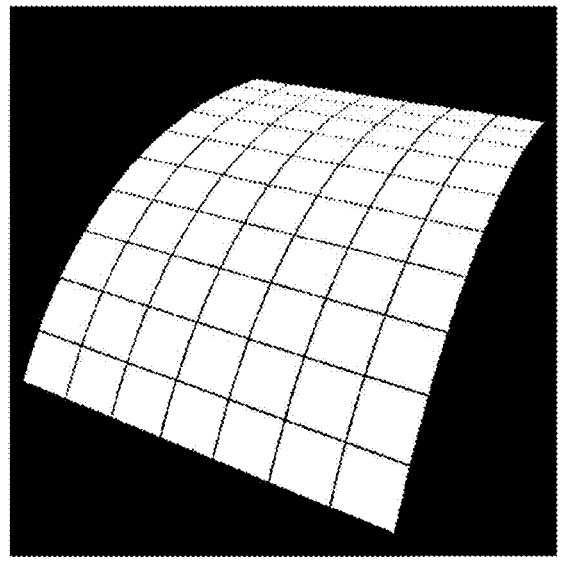
FIG. 18 is a diagram illustrating a warped state of a paper sheet.

In a sixth embodiment, the explanation is given for a case in which, during a preview display, the print image is displayed in a warped manner. FIG. 18 is a diagram illustrating a warped state of a paper sheet. In FIG. 18, ruled lines are illustrated in order to demonstrate the warped condition of the paper surface, and are not displayed during the actual preview.

During a preview display, if the print image is displayed in a warped manner as illustrated in FIG. 18; then, by the usual method, the normal vector at each position of the original data changes in orientation depending on the position of the original data (i.e., the normal vector no more has a uniform orientation).

Due to the manner of warping of the print image according to the sixth embodiment (FIG. 18), on the surface of the printed material in the 3D display preview, the regular reflection part of the paper portion and the image portion is displayed to have a complex shape. As a result, from the perspective of the complexity in the shape of lighting reflected on the surface of the printed material, it becomes possible to reproduce an "authentic" texture (gloss feel).

Seventh Embodiment

In a seventh embodiment, the explanation is given for a case in which a viewpoint position input device is used. The configuration according to the seventh embodiment is identical for the most part to the configuration according to the first embodiment. However, as compared to the first embodiment, the seventh embodiment differs in the way that, in addition to the configuration according to the first embodiment, a viewpoint position input device is disposed that enables varying the position of visual contact (viewpoint).

Figure 19:
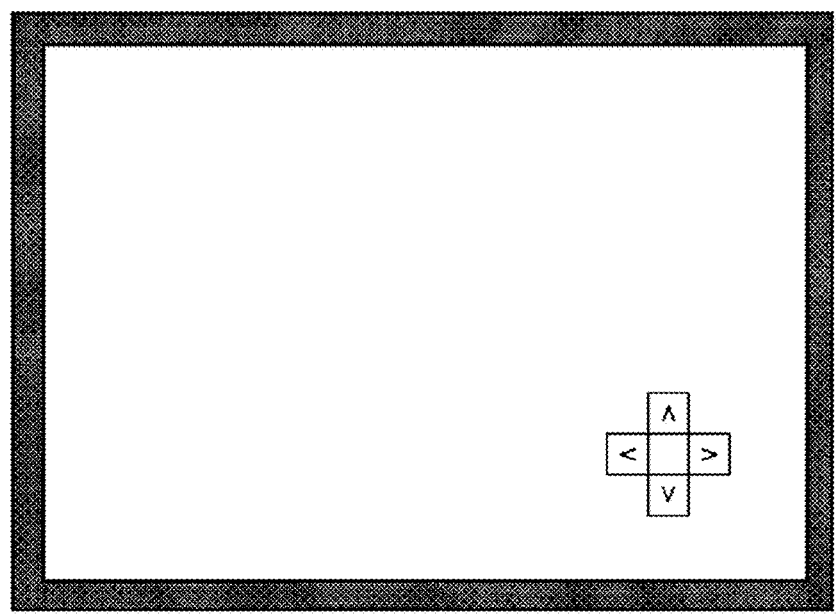
FIG. 19 is a diagram illustrating an exemplary cross-shaped key displayed on a display device.

In the seventh embodiment, a cross-shaped key as illustrated in FIG. 19 is displayed on the display that serves as the display device 102. If the cross-shaped key is clicked using a mouse that serves as the input device 101, then it becomes possible to move the viewpoint from side to side and up and down. Moreover, in the seventh embodiment, it is possible to move the viewpoint backward and forward by scrolling the mouse (the operation of the cross-shaped key using the mouse is converted into the x-coordinate and the y-coordinate of the viewpoint position in the virtual three-dimensional space, the scrolling operation is converted into the z-coordinate in the virtual three-dimensional space, and the viewpoint position is determined).

Then, the data for previewing is calculated with respect to the newly set viewpoint. As a result, during a 3D display preview, the preview image can be confirmed while varying the viewpoint position for viewing the printed material.

Meanwhile, the present invention is not limited to the abovementioned configuration, and it is possible to implement various modifications. That is, as long as the configuration includes a viewpoint position input device and enables generation of a preview image using the information input from the viewpoint position input device, any type of configuration can be implemented. A number of devices including a viewpoint position input mechanism have already been proposed. Hence, such devices may also be implemented.

Eighth Embodiment

In an eighth embodiment, the explanation is given for a case in which an original data position input device is used. The configuration according to the eighth embodiment is identical for the most part to the configuration according to the first embodiment. However, as compared to the first embodiment, the eighth embodiment differs in the way that, in addition to the configuration according to the first embodiment, an original data position input device that enables varying the position of the original data.

In the eighth embodiment, the placement position of the original data in the virtual three-dimensional space is set in such a way that the paper sheet rotates in the horizontal direction (rotates with the y-axis serving as the center of rotation) in response to horizontal movements of the mouse cursor. In an identical manner, the placement position of the original data in the virtual three-dimensional space is set in such a way that the paper sheet rotates in the vertical direction (rotates with the x-axis serving as the center of rotation) in response to vertical movements of the mouse cursor.

In this way, after the position of the original data is varied/determined in response to the mouse cursor, the data for previewing is calculated with respect to the newly set position of the original data. As a result, during a 3D display preview, it becomes possible to confirm the preview image while varying the position of the original data.

Ninth Embodiment

In a ninth embodiment, the explanation is given for a case in which the position of original data is determined upon reflecting a folding operation. The configuration according to the ninth embodiment is identical for the most part to the configuration according to the first embodiment. However, as compared to the first embodiment, the ninth embodiment differs in the way that, in addition to the configuration according to the first embodiment, an original-data position determining unit is disposed that determines the position of original data upon reflecting a predetermined folding operation.

In the ninth embodiment, the configuration includes a mechanism for determining the position of the original data upon reflecting a predetermined folding operation. In the eighth embodiment, the position of the original data is set at the placement position S(x, y, z) determined according to Equation (20) given above.

In the ninth embodiment, the configuration is such that determination of the placement position of the original data, calculation of the data for previewing, and performing a preview display on the display is performed in a repeated manner while varying the constant number a specified in Equation (20). That is, the configuration is such that an animation display is performed in which the printed material placement position changes in the virtual three-dimensional space.

In the ninth embodiment, the setting is such that the constant number a performs a reciprocating movement between the range of −0.1 to 0.1 at steps of 0.005. This corresponds to a state in which, in the virtual three-dimensional space, the printed material undergoes deformation while repeating being "convex on the upper side" and being "convex on the lower side".

In the ninth embodiment, because of the original-data position determining unit that determines the position of original data upon reflecting a predetermined folding operation, various folded states of the printed material are displayed in a 3D display preview.

From the perspective of expressing the "authenticity" of the printed material, displaying the folded states of the printed material is extremely important. The reason for that is thought to be as follows: the printed material is made of thin paper sheets. Hence, under normal viewing conditions, so many times the paper sheets are viewed in some or the other folded state (while viewing a printed material, it is not only the case that the printed material is kept on a completely flat place for the viewing purpose).

Moreover, in the ninth embodiment, the folded states are not still but are moving (i.e., moving images are displayed in which the folded states of a paper sheet change) so as to enable achieving expression of the paper texture with an enhanced "authenticity".

Meanwhile, the present invention is not limited to the abovementioned configuration. Alternatively, for example, any other original data placement method other than Equation (20) can also be implemented. The placement positions of the original data are presented as folded states other than the plane surface. Moreover, as long as such folded states can be displayed to be not still but moving, then any original data position determining method can be implemented.

Tenth Embodiment

In a tenth embodiment, the explanation is given for a case dealing with complex shapes of lighting. FIG. 20 is a diagram illustrating (4) paper-portion regular reflection application ratio data and (7) image-portion regular reflection application ratio data according to the tenth embodiment.

If the complex shapes illustrated in FIG. 20 are considered to be the abovementioned sets of data; then, during a 3D display preview of printed material, it becomes possible to deal with more complex shapes of lighting reflected on the surface of the printed material. The shapes of lighting reflected in the real printed material are complex in nature because of the real lighting conditions. Hence, using (4) paper-portion regular reflection application ratio data and (7) image-portion regular reflection application ratio data as illustrated in FIG. 20, it becomes possible to reproduce a more "authentic" printed material texture from the perspective of the complexity of the shapes of lighting.

In this way, as described above, in an image processing device according to the present invention, a printed material is displayed and, as far as the texture (the gloss feel) of the printed material is concerned, a high level of what is called "authenticity" is reproduced during a 3D display preview of the printed material.

Meanwhile, as explained above, in the conventional technology, it is not possible to reproduce a phenomenon in which the paper portion (the toner non-attachment portion) and the image portion (the toner attachment portion) have different textures (particularly, have different scopes of lighting that is reflected). For that reason, in the conventional technology, it is not possible to express the "authenticity" of the printed material. Besides, it is necessary to output a sample image and to perform measurement regarding a large number of patch images. Consequently, the LUT that gets created is also a large-scale LUT. As a result, it requires a large calculation load to calculate the value of the data for previewing.

According to the present invention, an image processing device for displaying a printed material includes a calculating unit that calculates display data based on the original data of the printed material, based on paper-portion diffuse reflection data, based on data that gives the texture of the paper-portion regular reflection of the printed material, and based on data that gives the texture of the image-portion regular reflection of the printed material.

The image processing device according to the present invention makes use of (1) paper portion diffuse reflection data; (2) paper portion regular reflection data; (3) paper-portion regular reflection applicable area data; (4) paper-portion regular reflection application ratio data; (5) image portion regular reflection data; (6) image-portion regular reflection applicable area data; and (7) image-portion regular reflection application ratio data. Moreover, the image processing device includes a preview data calculating unit that calculates the value of the data for previewing from the above-mentioned sets of data.

In the abovementioned configuration, (2) paper portion regular reflection data is incorporated according to the application ratio determined from (3) paper-portion regular reflection applicable area data and (4) paper-portion regular reflection application ratio data; and a regular reflection part (reflection of lighting) is formed in the paper portion (the portion in which the toner is not attached). On the other hand, (5) image portion regular reflection data is reflected according to the application ratio determined from (6) image-portion regular reflection applicable area data and (7) image-portion regular reflection application ratio data; and a regular reflection part (reflection of lighting) having a different state than in the paper portion is formed in the image portion (the portion in which the toner is attached).

As a result, it becomes possible to give a peculiar texture (gloss feel) to the paper portion as well as to the image portion of the print image. That is, as a result of the configuration according to the present invention, it becomes possible to reproduce a phenomenon in which the paper portion (the toner non-attachment portion) and the image portion (the toner attachment portion) have different textures (have different scopes of lighting that is reflected). That enables achieving reproduction of the "authenticity" of the printed material. Such an effect of the configuration according to the present invention cannot be achieved with the conventional technology.

Moreover, in the image processing device according to the present invention, because of the abovementioned configuration, while calculating the data for previewing, also regarding the calculation of the data for previewing in the regular reflection part (reflection of lighting) in the paper portion and the regular reflection part (reflection of lighting) in the image portion, there is no need to access a large-scale LUT (a color-by-color LUT that is three-dimensional data) and the determination can be done by a comparatively simpler data access. Hence, it becomes possible reduce the processing load required in the calculation of the data for previewing.

In contrast, in the conventional technology, from a reflection vector (R) of an eye vector, the angular difference between the reflection vector and a light source vector is calculated. Then, based on the angular difference and the colors of the pixels of interest of the preview image, a reflected light spread LUT is referred to and a reflected light spread parameter (n) is determined corresponding to the colors of the pixels of interest. However, since the reflected light LUT covers all the colors, it becomes an enormous three-dimensional LUT. Although it is possible to think of a method of reducing the scale of the LUT and calculate the reflected light spread (n) by means of interpolation, it then becomes necessary to perform an interpolation operation.

Moreover, in the conventional technology, using the reflected light spread (n) derived in the abovementioned manner, the specular colors are calculated according to a predetermined calculation formula. Then, in the conventional technology, after the specular colors are obtained, compression of the specular colors and calculation of the maximum value of the specular colors is performed followed by determination of the synthesis ratio between the specular colors and the diffuse reflection colors. Thus, in the conventional technology, the method requires a large calculation load for calculating the data for previewing and requires a large processing load.

As compared to the conventional technology, in the image processing device according to the present invention, only a small calculation load is required till the calculation of the data for previewing. In the configuration according to the present invention, in regard to reproducing the texture of a print image, in order to carry out the reflection of the regular reflection part in the paper portion and the regular reflection part in the image portion, a data access to a large-scale LUT is not required thereby enabling to implement a calculation method having a small calculation load. For that reason, during a 3D display preview of printed material, it becomes possible to perform the preview in which the texture of the printed material is successfully reproduced with only a small calculation load.

In the present invention, the image-portion regular-reflection-applicable-area data generating unit is disposed that generates (6) image-portion regular reflection applicable area data from the original data. As explained above, in the conventional technology, due to the factors such as only a single set of lighting data is used in calculating the value of the data for previewing, the scope of lighting (the extent of blurring of lighting) that is reflected in the paper portion is same as the scope of lighting (the extent of blurring of lighting) in the image portion. That is, in the conventional technology, it is not possible to have different gloss feels (textures) between the paper portion and the image portion.

According to the study done by the inventor(s) of the present invention, in the real printed material, oftentimes the paper portion and the image portion have different textures (gloss feels). For that reason, during a preview of the printed material, in order to reproduce the "authenticity" in an enhanced manner, it is necessary to reproduce the texture (the gloss feel) of the paper portion differently from the texture (the gloss feel) of the image portion.

With regard to such issues, in the image processing apparatus according to the present invention, it becomes possible to reproduce different textures (different scopes of lighting that is reflected) in the paper portion and the image portion, and to express the "authenticity" of the printed material.

In the present invention, in addition to that, the configuration is such that the image-portion regular-reflection-applicable-area data generating unit is disposed that generates (6) image-portion regular reflection applicable area data from the original data. As a result, there is an advantage that the user need not perform the task of preparing (6) image-portion regular reflection applicable area data. Herein, (6) image-portion regular reflection applicable area data is used for defining the area to which the characteristics of the image portion regular reflection are to be given. Hence, every time there is a change in the original data, it becomes necessary to prepare data suitable for the original data. However, it is a great burden for the user to directly create (6) image-portion regular reflection applicable area data.

In the configuration according to the present invention, the user only specifies the original data; and (6) image-portion regular reflection applicable area data that is required is generated in the image processing device. Then, (6) image-portion regular reflection applicable area data can be used in calculating the value of the data for previewing.

In this way, in the present invention, from the original data can be generated (6) image-portion regular reflection applicable area data that is required to reflect the gloss feel peculiar to the image portion (the toner attachment portion), that is, the gloss feel different than the paper portion (the toner non-attachment portion), in only the image portion. As a result, the user is spared from having to perform the cumbersome task of creating (6) image-portion regular reflection applicable area data.

In the present invention, the configuration is such that the paper-portion regular-reflection-applicable-area data generating unit is disposed that generates (3) paper-portion regular reflection applicable area data from the original data. As a result, there is an advantage that the user need not perform the task of preparing (3) paper-portion regular reflection applicable area data. In the configuration according to the present invention, the user only specifies the original data; and (3) paper-portion regular reflection applicable area data is generated in the image processing device. Then, (3) paper-portion regular reflection applicable area data can be used in calculating the value of the data for previewing.

In this way, in the present invention, from the original data can be generated (3) paper-portion regular reflection applicable area data that is required to reflect the gloss feel peculiar to the paper portion (the toner non-attachment portion), that is, the gloss feel different than the image portion (the toner attachment portion), in only the paper portion. As a result, the user is spared from having to perform the cumbersome task of creating (3) paper-portion regular reflection applicable area data.

In the present invention, the configuration is such that the image-portion regular reflection data generating unit is disposed that generates (5) image portion regular reflection data from the original data. As a result, there is an advantage that the user need not perform the task of preparing (5) image portion regular reflection data. In the configuration according to the present invention, the user only specifies the original data; and (5) image portion regular reflection data is generated from the original data in the image processing device. Then, (5) image portion regular reflection data can be used in calculating the value of the data for previewing.

Herein, (5) image portion regular reflection data is required in order to reproduce the gloss feel of the image portion (the toner attachment portion). However, since the image portion (the toner attachment portion) changes depending on the original data, it becomes necessary to prepare the image portion regular reflection data for each set of original data (i.e., the image portion regular reflection data changes dependent on the original data). However, it is a great burden for the user to directly create the image portion regular reflection data every time there is a change in the original data.

In the present invention, the configuration is such that from the original data can be generated the image portion regular reflection data that is required in order to reflect and reproduce the gloss feel peculiar to the image portion (the toner attachment portion), that is, the gloss feel different than the paper portion (the toner non-attachment portion), in the preview. As a result, the user is spared from having to perform the cumbersome task of creating the image portion regular reflection data.

In the present invention, the image-portion regular-reflection-applicable-area data generating unit converts the original data into toner attachment amount data and then generates (6) image-portion regular reflection applicable area data from the toner attachment amount data.

Herein, (6) image-portion regular reflection applicable area data has the function of specifying the area to which the gloss feel (texture) of the image portion is to be applied in a printed material preview. Generally, the image portion in a printed material has a different gloss feel for each color. However, in many cases, the gloss feel has a substantial correlation with the toner total attachment amount (the total of the toners of all used colors). Thus, it means that the gloss feel at the position of interest can be estimated from the toner total attachment amount at that position.

The reason for the gloss feel of the image portion in a printed material to have a substantial correlation with the toner total attachment amount can be explained as below. In the case when a printed material is formed with the toner of only a single color, if the condition of the toner being attached onto the paper sheet and a further increase in the toner attachment amount is considered from the perspective of the smoothness of the paper sheet and the toner surface, then the following situations arise.

If the amount of toner is a small amount, then there is a strong effect of the surface texture of the paper sheet. On the other hand, if the amount of toner is a large amount, then there is a strong effect of the surface texture of the toner itself. If the amount of toner is an intermediate amount, not only there is an effect of the surface texture of the paper sheet and the surface texture of the toner itself but there is also an effect of the toner placement state. At that time, since the gloss feel of the image portion is determined depending on the various characteristics of the paper sheet and the toner, it is not always true that the gloss feel changes in a monotonous manner depending on the toner attachment amount. However, once the type of paper, the toner, and the toner attachment amount is determined; the gloss feel gets determined in an almost unambiguous manner. Thus, if the type of paper, the toner, and the toner attachment amount are same; then the gloss feel of the image remains approximately the same.

Meanwhile, image formation on a printed material is performed using the toners of four colors of CMYK. In a printed material in which the four colors of CMYK are used, the gloss feel at the position of interest has a substantial correlation with the toner total attachment amount (the total of the toners of all used colors) at that position. In case the gloss-related characteristics of the CMYK colors are totally different, then it is believed that the gloss feel cannot be predicted from only the total of toners of all colors.

However, in the case when the color toners have mutually different gloss feels, the user feels a sense of discomfort in the first place about the image. For that reason, in a printed material for commercial purposes, the toner characteristics are determined in such a way that each color toner has the same gloss feel. Hence, when each color toner has the same gloss feel and when image formation is performed using the toners of four colors, it becomes possible to estimate the gloss feel from the toner total attachment amount that is the total of toners of all colors.

As is the configuration according to the present invention, even when toner total attachment amount data (the total of all colors) is calculated and the image-portion regular reflection applicable area data is generated with the toner total attachment amount data serving as the reference of the gloss feel, it becomes possible to generate preview data in which the image portion has a suitable gloss feel given thereto.

Regarding the effect achieved due to the configuration according to the present invention, it is possible to think in the following manner. The original data is generally made of color data of the RGB colors. However, in the case when the user creates (6) image-portion regular reflection applicable area data while visually confirming the real printed material, he or she specifies the value of the image-portion regular reflection applicable area data with respect to each color (three-dimensional data). However, considering the enormity and complexity of the workload, it is not practical to manually perform three-dimensional data matching.

As a result of such manual operations, in the case of adjusting (6) image-portion regular reflection applicable area data, if the image-portion regular reflection applicable area data is generated via and with reference to attachment amount data (one-dimensional) that is generated from the original data, then the operations become simpler and uncomplicated. Moreover, as described above, since the gloss feel can be estimated from the toner total attachment amount that is the total of toners of all colors, there is no occurrence of a decline in the quality.

In the configuration according to the present invention, it becomes possible to enable the user to perform an operation of adjusting (6) image-portion regular reflection applicable area data in such a way that the gloss feel of the image portion matches with the real printed material. As a result, during a 3D display preview of printed material, it becomes possible to reflect the gloss feel desired by the user in the image portion.

In the present invention, the paper-portion regular-reflection-applicable-area data generating unit once converts the original data into the toner total attachment amount data and then generates (3) paper-portion regular reflection applicable area data from the toner attachment amount data.

Herein, (3) paper-portion regular reflection applicable area data has the function of specifying the area to which the texture (the gloss feel) of the paper portion is to be applied in a printed material preview. As described above, generally, the image portion in the printed material (the portion in which the toner attachment amount is reflected in small amount and the gloss feel of the paper sheet is reflected in a substantial amount) has a different gloss feel for each color. However, oftentimes the gloss feel has a substantial correlation with the toner total attachment amount (the total of toners of the used colors). Thus, it means that the gloss feel at the position of interest can be estimated from the toner total attachment amount at that position.

In (3) paper-portion regular reflection applicable area data, an area is specified in which the gloss feel of the paper sheet is reflected. That is equivalent to specifying the extent of toner total attachment amount up to which the gloss feel of the paper sheet is strongly reflected.

Regarding the fact that the gloss feel in a printed material has a substantial correlation with the toner total attachment amount, the reason is as described above. Such a phenomenon comes into existence also at a location of interest of the present invention at which the toner attachment amount is small and the gloss feel of the paper sheet has a large contribution. Moreover, in the present invention too, the fact that the toner characteristics are determined so as to have the same gloss feel for the toner of each of CMYK colors is assumed to hold true to a number of printed materials. For that reason, all color toners have the same gloss feel, and it is possible to estimate the gloss feel from the toner total attachment amount that is the total of toners of all colors.

That is, as is the configuration according to the present invention, even when the toner total attachment amount data (the total of all colors) is calculated and (3) paper-portion regular reflection applicable area data is generated with the toner total attachment amount data serving as the reference of the gloss feel; it becomes possible to generate preview data in which, with respect to the image portion in which the toner attachment amount is small and the effect of the paper gloss is strong, a suitable gloss feel is given.

Regarding the effect achieved due to the configuration according to the present invention, it is possible to think in the following manner. The original data is generally made of color data of the RGB colors. However, in the case when the user creates (3) paper-portion regular reflection applicable area data while visually confirming the real printed material, he or she specifies the value of (3) paper-portion regular reflection applicable area data with respect to each color (three-dimensional data). However, considering the enormity and complexity of the workload, it is not practical to manually perform three-dimensional data matching.

As a result of such manual operations, in the case of adjusting (3) paper-portion regular reflection applicable area data, if (3) paper-portion regular reflection applicable area data is generated via and with reference to the toner total attachment amount data (one-dimensional) that is generated from the original data, then the operations become simpler and uncomplicated. Moreover, as described above, since the gloss feel can be estimated from the toner total attachment amount that is the total of toners of all colors, there is no occurrence of a decline in the quality.

Thus, in the configuration according to the present invention, it becomes possible to enable the user to perform an operation of adjusting (3) paper-portion regular reflection applicable area data in such a way that the gloss feel of the image portion having a small toner total attachment amount matches with the real printed material. As a result, during a 3D display preview of printed material, it becomes possible to reflect the gloss feel desired by the user in the image portion having a small toner attachment amount.

In the present invention, (4) paper-portion regular reflection application ratio data and (7) image-portion regular reflection application ratio data are sets of data that differ depending on the position. As described above, in the conventional technology, the scope of lighting (the extent of blurring of lighting) reflected in the paper portion (the toner non-attachment portion) is same as the scope of lighting (the extent of blurring of lighting) reflected in the image portion (the toner attachment portion) mainly because only a single set of lighting data is used in calculating the data for previewing. That is, in the conventional technology, the paper portion and the image portion cannot be given different gloss feels (textures).

As described above, in order to enable reproduction with an enhanced "authenticity" during a printed material preview, it is necessary to reproduce different gloss feels (textures) for the paper portion and the image portion.

In the present invention, the configuration is such that (4) paper-portion regular reflection application ratio data and (7) image-portion regular reflection application ratio data are sets of data which differ depending on the position. Hence, in a 3D display preview, the gloss feel of the printed material can be expressed while having different scopes of lighting reflected in the paper portion and the image portion.

In the configuration according to the present invention, for example, even in the case when a printed material is such that the paper portion has a high degree of gloss and the image portion has a low degree of gloss or in the case when a printed material is such that the paper portion has a low degree of gloss and the image portion has a high degree of gloss; the degrees of gloss can be expressed in a 3D display preview.

Moreover, in the present invention, even regarding a phenomenon explained in the conventional technology in which the gloss of a medium concentration area is lower than the paper portion and the image portion (i.e., the reflection of lighting spreads in a wider area), that phenomenon can be reproduced in a 3D display preview.

In the configuration according to the present invention, the paper portion and the image portion can be given different textures (gloss feels). Hence, during a 3D display preview of printed material, a preview can be performed with an enhanced "authenticity" with respect to the real printed material.

In the present invention, the configuration is such that (4) paper-portion regular reflection application ratio data and (7) image-portion regular reflection application ratio data are sets of regular reflection application ratio data that have a different regular reflection application ratio data value depending on the position and that satisfy Equation (9).

According to the study (the comparison experiments according to the first embodiment) done by the inventor(s) of the present invention, when (4) paper-portion regular reflection application ratio data and (7) image-portion regular reflection application ratio data are created to satisfy Equation (9), it was found that the manner of switching between the regular reflection area and the diffuse reflection area appearing on the paper surface gives the appearance of the shape of lighting reflected on the printed material surface of the real printed material, thereby contributing in reproducing a more "authentic" printed material texture.

In this study, apart from Equation (9), an attempt was made to apply other relational expressions (such as a Gaussian function) having similar shapes. In the case of such relational expressions having similar shapes; although the result was not poor, the shape of lighting reflected on the printed material surface could not be reproduced with as "authenticity" as achieved in Equation (9).

Equation (9) indicates that, farther from the position at which the application ratio data becomes equal to the local maximum, the two sets of regular reflection application ratio data become smaller as a function of the square of the distance from the local maximum value. In the reflection of lighting on a real paper sheet, the position at which the two sets of regular reflection application ratio data are equal to the local maximum corresponds to the position at the center of lighting. For that reason, using the two sets of regular reflection application ratio data having the characteristics indicated in Equation (9), the manner of attenuation from the center of lighting to the surrounding portion in the reflection of lighting on the real paper sheet can be reflected in an appropriate manner.

As a result, in a 3D display preview of printed material according to the present invention, from the perspective of the manner of attenuation from the center of lighting to the surrounding portion in the reflection of lighting, it becomes possible to reproduce an "authentic" printed material texture.

Meanwhile, in the configuration according the present invention, a normal vector determining unit is disposed that determines the normal vector at the position of the original data in such a way that the normal vector at the surface position of the original data changes according to the surface position of the original data.

According to the study done by the inventor(s) of the present invention, when the setting is such that the normal vector at each position on the original data surface differs according to the position of the original data, the regular reflection part of the paper portion and the regular reflection part of the image portion form a complex shape and appear on the printed material display. As far as a real printed material is concerned, the printed material itself does not have a particularly high degree of stiffness. Hence, when the printed material is held in hands or placed on a non-planar place, the printed material is not completely planar in nature. Rather, it is not an exaggeration to say that oftentimes the printed material is viewed in a non-planar state thereof. In the case when a printed material is viewed in a non-planar state thereof, the lighting on the printed material surface falls in a complex shape. Besides, one more aspect is that, when the reflection of lighting on the printed material surface is complex in shape, the preview of the printed material feels normal.

The present invention has been made in view of such issues. Herein, the setting is such that the normal vector at the position of the original data changes according to the surface position of the original data. Hence, in a 3D display preview, the paper portion regular reflection area and the image portion regular reflection area that are reflected on the printed material surface can be complex in shape or can change in a complex manner (if the normal vector is same at each position of the original data, then the paper portion regular reflection area and the image portion regular reflection area are monotonous in shape or change in a monotonous manner).

As a result, in a 3D display preview according to the present invention, from the perspective of the complexity or the complex nature of changes of the shape of lighting reflected in the printed material surface, it becomes possible to reproduce an "authentic" printed material texture.

In the configuration according to the present invention, the visual contact position input device is disposed that enables changing the position of visual contact (visual confirmation). In the present invention, since the visual contact position input device is disposed that enables changing the position of visual contact, it becomes possible to reproduce a state in which the printed material is viewed from the position of visual contact desired by the user and to display the reproduced state in the 3D display preview. As a result, the user becomes able to confirm the texture (the gloss feel) of the printed material from various positions of visual contact. That is helpful in confirming the three-dimensional texture of the printed material which is the original texture.

In the present invention, in a 3D display preview, it becomes possible to enable confirmation of the texture of the printed material from the position of visual contact desired by the user. As a result, the three-dimensional texture of the printed material can be reproduced and confirmed in the preview.

In the configuration according to the present invention, the printed material position input device is disposed that enables changing the printed material position. In the present invention, since the printed material position input device is disposed that enables changing the printed material position, it becomes possible to reproduce a state in which the printed material is placed at the position desired by the user and to display the reproduced state in a 3D display preview. As a result, the user becomes able to confirm the reflected light from the printed material at various placement positions. That is helpful in confirming the three-dimensional texture of the printed material which is the original texture.

In the present invention, in a 3D display preview, it becomes possible to enable reproduction of the state in which the printed material is placed at the position desired by the user. As a result, the three-dimensional texture of the printed material can be reproduced and confirmed in the preview.

In the configuration according to the present invention, a printed material position determining unit is disposed that determines the position of the printed material upon reflecting a predetermined folding operation.

According to the study done by the inventor(s) of the present invention, in order to express the "authenticity" of the printed material, not only the reflection of the lighting that is the texture (the gloss feel) explained in the present invention is important but also the folded state of the printed material (paper) is also important. Because of the combination of the paper portion regular reflection/image portion regular reflection of the printed material and the non-planar folded state of the printed material, there is an enhancement in the "authenticity" of the printed material in the 3D display preview. Moreover, since the folded state is not still but changing/moving (i.e., moving images are displayed in which the folded states of a paper sheet change), it becomes possible to express the paper texture with an enhanced "authenticity".

The present invention has been made in view of such issues. Herein, the printed material position determining unit is disposed that determines the position of the printed material upon reflecting a predetermined folding operation. Hence, in a 3D display preview, the positions of the printed material can be displayed as moving images in which the folded states of the printed material change. As a result, it becomes possible to express the paper texture with an enhanced "authenticity".

Thus, according to an aspect of the present invention, it becomes possible to achieve a three-dimensional display in which the texture of the printed material including the gloss feel of the printed material is enhanced.

In an aspect of the present invention, regarding a 3D display preview function, there is provided a technology that, at the time of displaying the texture and the gloss feel of a printed material (the texture and the gloss feel of an entire printed material including the paper sheet and the toner attachment portion) on a display device such as a display, contributes in enhancing the reproducibility of the texture (the gloss feel).

That is, in an aspect of the present invention, in regard to the texture (the gloss feel) of the paper portion and the texture (the gloss feel) of the image portion, there is provided a method by which the paper portion and the image portion have different textures (gloss feels), particularly have the reflection of different scopes of lighting, so that the authenticity of the real printed material can be reproduced in a 3D display preview. Moreover, in another aspect of the present invention, there is provided a method for reproducing the texture in a printed material preview by which the following issues arising in the conventional technology are resolved: an enormous number of man-hours are required for creating/accessing a look up table (LUT); and a large calculation load is required as far as real-time processing is concerned.

In an aspect of the present invention, there is provided a method for reproducing the printed material texture by which there is no occurrence of an issue of having to obtain an enormous volume of data while creating the parameter (n) indicating the degree of diffusion of the gloss or an issue of facing an increase in the calculation load while calculating the value of data for preview display.

In an aspect of the present invention, a method for reproducing the paper texture is proposed by which only a small calculation load is required to calculate the value of data for preview display and there is no occurrence of the issue of requiring to toil a lot to deal with an output image formed on a new paper sheet.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device that displays a printed material, comprising:
 a processor configured to,
  calculate display data based on,
   original data of an image printed on a sheet of paper,
   first data indicating diffuse reflection of the sheet, the first data being a function of a position of a surface on the sheet,
   second data indicating regular reflection texture of the sheet to a display image for displaying texture of the printed material, the second data being a function of the position on surface on of the sheet, the second data containing (i) fourth data indicating the regular reflection of the sheet, (ii) fifth data used for instructing segmentation of an area in which the fourth data is to be applied and an area in which the fourth data is not to be applied, and (iii) sixth data indicating ratios at which the fourth data is applied, and
   third data indicating regular reflection texture of the image to the display image for displaying the texture of the printed material, the third data containing (i) seventh data indicating regular reflection of the image, (ii) eighth data used for instructing segmentation of an area in which the seventh data is to be applied and an area in which the seventh data is not to be applied, and (iii) ninth data indicating ratios at which the seventh data is applied;
  place the sixth data at a position in a virtual three-dimensional space;
  place the original data in such a way that a placement relationship with the sixth data is satisfied; and
  calculate the second data based on (i) a value of the sixth data at a position indicated by a reflection vector of a vector directed from a viewpoint portion in the virtual three-dimensional space toward a position of interest in the original data, (ii) a value of the fifth data at the position of interest in the original data, and (iii) a value of fourth data at the position of interest in the original data.

2. The image processing device according to claim 1, wherein the processor includes an image-portion regular-reflection-applicable-area data generating unit configured to generate the eighth data from the original data.

3. The image processing device according to claim 1, wherein the processor includes a paper-portion regular-reflection-applicable-area data generating unit configured to generate the fifth data from the original data.

4. The image processing device according to claim 1, further comprising an image-portion regular reflection data generating unit configured to generate the seventh data from the original data.

5. The image processing device according to claim 2, wherein the processor is configured to,
calculate, from the original data, tenth data indicating an amount of toner attached; and
convert the tenth data into the eighth data.

6. The image processing device according to claim 3, wherein the processor is configured to,
calculate, from the original data, tenth data indicating an amount of toner attached; and
convert the tenth data into the fifth data.

7. The image processing device according to claim 1, wherein each of the sixth data and the ninth data has data values that differ according to positions.

8. The image processing device according to claim 1, wherein the first data, the fourth data, the fifth data, the sixth data, the seventh data, the eighth data, and the ninth data differ according to a type of the sheet.

9. The image processing device according to claim 1, wherein a normal vector at each position of the original data changes depending on the position of the original data.

10. The image processing device according to claim 1, wherein the processor includes a position determining unit configured to determine an arrangement position of each position of the original data upon reflecting a folding operation.

11. The image processing device of claim 1, wherein the processor is configured to,
estimate three-dimensional color data from one-dimensional total toner attachment amount data indicating a total amount of toner to apply to various positions of the sheet to generate the original image, and
generate one or more of the second data and the third data based on the estimated three-dimensional color data.

12. The image processing device of claim 11, wherein the processor is configured to calculate the display data such that a weight given to the regular reflection of the sheet is inversely proportional to the one-dimensional total toner attachment amount data.

13. An image processing device that displays a printed material, comprising:
a processor configured to,
calculate display data based on,
original data of an image printed on a sheet of paper,
first data indicating diffuse reflection of the sheet, the first data being a function of a position of a surface on the sheet,
second data indicating regular reflection texture of the sheet to a display image for displaying texture of the printed material, the second data being a function of the position of on surface on of the sheet, the second data containing (i) fourth data indicating the regular reflection of the sheet, (ii) fifth data used for instructing segmentation of an area in which the fourth data is to be applied and an area in which the fourth data is not to be applied, and (iii) sixth data indicating ratios at which the fourth data is applied, and
third data indicating regular reflection texture of the image to the display image for displaying the texture of the printed material, the third data containing (i) seventh data indicating regular reflection of the image, eighth data used for instructing segmentation of an area in which the seventh data is to be applied and an area in which the seventh data is not to be applied, and (iii) ninth data indicating ratios at which the seventh data is applied;
place the ninth data at a position in a virtual three-dimensional space;
place the original data in such a way that a placement relationship with the ninth data is satisfied; and
calculate the third data based on la a value of the ninth data at a position indicated by a reflection vector of a vector directed from a viewpoint portion in the virtual three-dimensional space toward a position of interest in the original data, (ii) a value of the eighth data at the position of interest in the original data, and (iii) a value of the seventh data at the position of interest in the original data.

14. An image processing device that displays a printed material, comprising:
a processor configured to calculate display data based on,
original data of an image printed on a sheet of paper,
first data indicating diffuse reflection of the sheet, the first data being a function of a position of a surface on the sheet,
second data indicating regular reflection texture of the sheet to a display image for displaying texture of the printed material, the second data being a function of the position of on surface on of the sheet, the second data containing (i) fourth data indicating the regular reflection of the sheet, (ii) fifth data used for instructing segmentation of an area in which the fourth data is to be applied and an area in which the fourth data is not to be applied, and (iii) sixth data indicating ratios at which the fourth data is applied, and
third data indicating regular reflection texture of the image to the display image for displaying the texture of the printed material, the third data containing (i) seventh data indicating regular reflection of the image, (ii) eighth data used for instructing segmentation of an area in which the seventh data is to be applied and an area in which the seventh data is not to be applied, and (iii) ninth data indicating ratios at which the seventh data is applied, wherein,
when a position indicating a local maximum value of the sixth data and a local maximum value of the eighth data are set to $(x_0, y_0)$, a value $PR(x, y)$ of the sixth data and a value $IR(x, y)$ of the ninth data have an attenuation characteristic represented in $$PR(x, y), IR(x, y) = \frac{a}{1 + \left(\frac{r}{b}\right)^2} + c$$

$$r = ((x - x_0)^2 - (y - y_0)^2)^{0.5}$$

where, parameters a, b, and c are constant numbers.

* * * * *